(12) United States Patent
Fraenkel

(10) Patent No.: US 7,163,963 B2
(45) Date of Patent: Jan. 16, 2007

(54) CHEMICALLY AND THERMALLY STABILIZED ALUMINA FOR FISCHER-TROPSCH CATALYSTS

(75) Inventor: Dan Fraenkel, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 50 days.

(21) Appl. No.: 10/657,585

(22) Filed: Sep. 8, 2003

(65) Prior Publication Data

US 2005/0054738 A1   Mar. 10, 2005

(51) Int. Cl.
*B01J 23/00* (2006.01)
*C07C 27/06* (2006.01)

(52) U.S. Cl. .................. 518/715; 518/716; 502/302; 502/326; 502/327; 502/330; 502/332; 502/333; 502/334; 502/339; 502/355; 502/415; 502/439

(58) Field of Classification Search .......... 502/302, 502/326–342, 344–346, 348–351, 355, 415, 502/439; 518/716, 715
See application file for complete search history.

(56) References Cited

U.S. PATENT DOCUMENTS

| | | | |
|---|---|---|---|
| 2,892,858 A | 6/1959 | Ziegler | |
| 3,108,888 A * | 10/1963 | Bugosh | 501/95.1 |
| 3,284,370 A * | 11/1966 | Clifford et al. | 502/304 |
| 3,824,113 A * | 7/1974 | Loxley et al. | 427/431 |
| 3,852,190 A | 12/1974 | Buss et al. | |
| 3,993,572 A * | 11/1976 | Hindin et al. | 502/304 |
| 4,012,313 A | 3/1977 | Buss et al. | |
| 4,063,851 A | 12/1977 | Weldon | |
| 4,123,389 A * | 10/1978 | Pieters et al. | 502/225 |
| 4,143,211 A * | 3/1979 | Obinata et al. | 428/650 |
| 4,224,192 A | 9/1980 | Foster et al. | |
| 4,387,085 A | 6/1983 | Fanelli et al. | |
| 4,413,064 A | 11/1983 | Beuther et al. | |
| 4,471,144 A | 9/1984 | Arena | |
| 4,617,183 A | 10/1986 | Lewis et al. | |
| 4,678,770 A * | 7/1987 | Wan et al. | 502/304 |
| 4,692,318 A | 9/1987 | Tolpin et al. | |
| 4,708,945 A | 11/1987 | Murrell et al. | |
| 4,708,946 A * | 11/1987 | Ohata et al. | 502/304 |

(Continued)

FOREIGN PATENT DOCUMENTS

GB    640965    8/1950

(Continued)

OTHER PUBLICATIONS

Ihns Schulz; Short History and Present Trends of Fischer-Tropsch Synthesis; Abstract; Universiot Karlsruhe, Germany; 10 pages.

(Continued)

*Primary Examiner*—Cam N. Nguyen
(74) *Attorney, Agent, or Firm*—Conley Rose P.C.

(57) ABSTRACT

This invention is generally related to the field of Fischer-Tropsch catalysts. In particular, the present invention is related to a Fischer-Tropsch catalyst and method of making same. More particularly, the present invention discloses a catalyst comprising a support and at least one catalytically active metal wherein the support comprises a transition alumina including theta-alumina, delta-alumina, or combinations thereof, and a surface coverage comprising at least one rare-earth oxide.

75 Claims, 3 Drawing Sheets

Comparison of activity retention, A.R. for catalysts C1-C5

U.S. PATENT DOCUMENTS

| Patent | | Date | Inventor | |
|---|---|---|---|---|
| 4,722,920 | A | 2/1988 | Kimura et al. | |
| 4,738,941 | A * | 4/1988 | Dufresne et al. | 502/66 |
| 4,738,946 | A * | 4/1988 | Yamashita et al. | 502/303 |
| 4,744,974 | A | 5/1988 | Lewis et al. | |
| 4,831,007 | A | 5/1989 | Murrell et al. | |
| 4,843,056 | A * | 6/1989 | Matsumoto et al. | 502/302 |
| 4,849,398 | A * | 7/1989 | Takada et al. | 502/303 |
| 4,880,763 | A | 11/1989 | Eri et al. | |
| 4,891,127 | A | 1/1990 | Murrel et al. | |
| 4,906,176 | A * | 3/1990 | Yamashita et al. | 431/7 |
| 4,977,126 | A * | 12/1990 | Mauldin et al. | 502/242 |
| 5,041,407 | A * | 8/1991 | Williamson et al. | 502/303 |
| 5,055,019 | A | 10/1991 | Meyer et al. | |
| 5,059,366 | A * | 10/1991 | Galaj et al. | 264/44 |
| 5,102,851 | A | 4/1992 | Eri et al. | |
| 5,116,800 | A * | 5/1992 | Williamson et al. | 502/303 |
| 5,116,879 | A | 5/1992 | Eri et al. | |
| 5,134,107 | A | 7/1992 | Narula | |
| 5,155,085 | A | 10/1992 | Hamano et al. | |
| 5,208,204 | A * | 5/1993 | Subramanian et al. | 502/303 |
| 5,223,472 | A * | 6/1993 | Simpson et al. | 502/314 |
| 5,232,580 | A | 8/1993 | Le et al. | |
| 5,518,823 | A * | 5/1996 | Fujihira et al. | 428/610 |
| 5,565,399 | A * | 10/1996 | Fraenkel et al. | 502/304 |
| 5,593,933 | A * | 1/1997 | Chattha et al. | 502/317 |
| 5,672,557 | A * | 9/1997 | Williamson et al. | 502/303 |
| 5,837,634 | A | 11/1998 | McLaughlin et al. | |
| 5,877,106 | A | 3/1999 | Kharas et al. | |
| 5,965,481 | A * | 10/1999 | Durand et al. | 502/304 |
| 6,030,597 | A | 2/2000 | Buchanan et al. | |
| 6,060,524 | A | 5/2000 | Casanave et al. | |
| 6,063,358 | A | 5/2000 | Lindquist et al. | |
| 6,087,295 | A * | 7/2000 | Kharas et al. | 502/300 |
| 6,224,846 | B1 | 5/2001 | Hurlburt et al. | |
| 6,255,358 | B1 | 7/2001 | Singleton et al. | |
| 6,262,132 | B1 | 7/2001 | Singleton et al. | |
| 6,271,432 | B1 | 8/2001 | Singleton et al. | 585/700 |
| 6,303,531 | B1 | 10/2001 | Lussier et al. | |
| 6,511,642 | B1 * | 1/2003 | Hatanaka et al. | 423/239.1 |
| 6,537,945 | B1 | 3/2003 | Singleton et al. | 502/327 |
| 6,596,667 | B1 * | 7/2003 | Bellussi et al. | 502/332 |
| 6,693,060 | B1 | 2/2004 | Park et al. | |
| 6,744,016 | B1 * | 6/2004 | Watanabe et al. | 219/270 |
| 2001/0054610 | A1* | 12/2001 | Watanabe et al. | 219/544 |
| 2002/0155946 | A1 | 10/2002 | Bogdan et al. | |
| 2003/0032554 | A1 | 2/2003 | Park et al. | |
| 2004/0216995 | A1* | 11/2004 | Nguyen et al. | 204/243.1 |

FOREIGN PATENT DOCUMENTS

| | | |
|---|---|---|
| GB | 2 352 194 A | 1/2001 |
| WO | WO 99/42214 | 8/1999 |
| WO | WO 02/07883 A2 | 1/2002 |

OTHER PUBLICATIONS

M. Absi-Halabi, et al.; "Studies on Pore SIze Control of Alumina: Preparation of Alumina Catalyst Extrudates with Large Unimodal Pore Structure by Low Temperature Hydrothermal Treatment"; Preparation of Catalysts V, 1991 Elsevier Science Publishers B.V., Amsterdam, pp. 155-163.

ALCOA World Chemical; "High purity, high density, boehmite aluminas"; ALCOA Product Data USA/6070-RO4/0801; 2 pages.

ALCOA World Chemical; "High purity, high density, boehmite aluminas"; ALCOA Product Data Sheet USA/6070-RO4/0801; 2 pages.

Condea; "High purity activated aluminas PURALOX, CATALOX"; Product Information Sheet Oct. 1999; 6 pages.

Rong-Sheng Zhou, et al.; "Structures and Transformation Mechanisms of the η, γ and θ Transition Aluminas"; International Union of Crystallography 1991; Institute for Ceraminc Superconductivity, New York State College of Ceramics, Alfred University, Alfred, NY 14802, USA; pp. 617-630.

Richard L. Smith, et al.; "The Influence of Diaspore Seeding and Chlordie Concentration on the Transformation of 'Diasporic' Precursors to Corundum"; Journal of the American Ceramic Society, Oct. 16, 2000; 31 pages.

S. Matsuda, et al.; "A New Support Material for Catalytic Combustion Above 1000 C"; 8th International Congress on Catalysis; vol. IV: Impact of surface science on catalysis, structure-selectivity/activity correlations, new routes for catalyst synthesis, pp. IV-879-IV-889.

H.C. Stumpf, et al.; "Thermal Transformations of Aluminas and Alumina Hydrates"; Industrial and Engineering Chemistry, vol. 42, No. 7, Jul. 1950; pp. 1398-1403.

Shu-Hui Cai, et al.; "Atomic Scale Mechanism of the Transformation of γ-Alumina to θ-Alumina"; The American Physical Society 2002; Physical Review Letters, vol. 89, No. 23; Dec. 2, 2002; 4 pages.

Zhong-Wen Liu, et al.; "Partial Oxidation of Methane Over Nickel Catalysts Supported on Various Aluminas"; Korean J. Chem. Eng., vol. 19, No. 5, pp. 735-741 (2002).

Hyun-Seog Roh, et al.; "Partial Oxidation of Methane Over Ni/θ-$Al_2O_3$ Catalysts"; Chemistry Letters 2001; Mar. 19, 2001; pp. 666-667.

Hyun-Seog Roh, et al.; "Partial Oxidation of Methane Over Ni/Ce-$ZrO_2$/θ-$Al_2O_3$"; Korean J. CHem. Eng., vol. 19, No. 5; pp. 742-748 (2002).

Hiromichi Arai, et al.; "Thermal stabilization of catalysts supports and their application to high-temperature catalytic combustion"; Applied Catalysis A: General 138 (1996); pp. 161-176; Elsevier Science Publishers B.V., Amsterdam.

Bernard Beguin et al.; "Stabilization of alumina by addition of lanthanum"; Applied Catalysis A: General 138 (1996); pp. 161-176; Elsevier Science Publishers B.V., Amsterdam.

Francois Oudet, et al.; "Thermal Stabilization of Transition Alumina by Structural Coherence with LnAlO3 (Ln=La, Pr, Nd)"; Journal of Catalysts vol. 114; pp. 112-120 (1988).

H. Schaper, et al.; "The Influence of Lanthanum Oxide on the Thermal Stability of Gamma Alumina Catalyst Supports"; Applied Catalysis, vol. 7 (1983), pp. 211-220; Elsevier Science Publishers B.V., Amsterdam.

Jalajakumari Nair, et al.; "Pore Structure Evolution of Lanthana-Alumina Systems Prepared Through Coprecipitation"; J. Am Ceram. Soc., vol. 83, No. 8; pp. 1942-1946 (2000).

S. N. Rashkeev, et al.; "Transition metal atoms on different alumina phases: The role of subsurface sites on catalytic activity"; Physical Review B, vol. 67, No. 115414; 4 pages.

Hennie Schaper, et al.; "Thermal Stabilization of High Surface Area Lumina"; Solid State Ionics, vol. 16 (1985), pp. 261-266.

Xiaoyin Chen, et al.; "High temperature stabilization of alumina modified b lanthanum species"; Applied Catalysis A: General, vol. 205 (2001); pp. 159-172.

S. Subramanian, et al.; "Characterization of lanthana/alumina composite oxides"; Journal of Molecular Catalysis, vol. 69 (1991); pp. 235-245.

P. Souza Santos, et al.; "Standard Transition Aluminas. Electron Microscopy Studies"; Materials Research, vol. 3, No. 4; pp. 104-114, 2000.

* cited by examiner

Comparison of activity retention, A.R. for catalysts C1-C5

Comparison of activity retention, A.R. of catalysts C9 and C10

Comparison of the performance factor, Fp of catalysts C1-C5

Comparison of the performance factor, Fp of catalysts C6, C7 and C8

Comparison of the performance factor, Fp of catalysts C9 and C10

CHEMICALLY AND THERMALLY STABILIZED ALUMINA FOR FISCHER-TROPSCH CATALYSTS

FIELD OF THE INVENTION

This invention is generally related to the field of Fischer-Tropsch catalysts. In particular, the present invention is related to a Fischer-Tropsch catalyst and method of making same. More particularly, the present invention discloses a catalyst comprising a support and at least one catalytically active metal wherein the support comprises a transition alumina and a surface coverage comprising a rare-earth oxide.

BACKGROUND OF THE INVENTION

The Fischer-Tropsch process is a chemical process of increasing relevance as a source of middle distillates from which transportation fuels, including diesel fuel, gasoline and aviation fuels, are derived. It is especially important as natural sources of these middle distillate fractions, namely crude petroleum, are dwindling with world reserves expected to near depletion within a century or less. The Fischer-Tropsch process comprises contacting a reactant gas mixture comprising carbon monoxide and hydrogen, called synthesis gas or syngas, with a catalyst in a suitable reactor and under suitable conditions of pressure and temperature to produce a product mixture comprising hydrocarbons, carbon dioxide and/or water; the outcome depending, in part, on the hydrogen:carbon monoxide ($H_2$:CO) ratio, the reactor conditions of temperature and pressure, the nature of the catalyst and the synergy between all these factors. As shown in stoichiometric Eqns. (1) and (2), a 2:1 $H_2$:CO ratio tends to produce water as a byproduct, whereas a 1:2 $H_2$:CO ratio tends to produce $CO_2$ as a byproduct. A competing reaction called the water-gas shift reaction converts carbon monoxide (CO) and water ($H_2O$) to carbon dioxide ($CO_2$) and hydrogen ($H_2$); serving the triplicate function of consuming generated water vapor, increasing the $H_2$:CO ratio and producing $CO_2$.

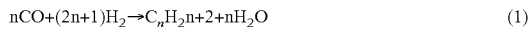

$$nCO + (2n+1)H_2 \rightarrow C_nH_{2n+2} + nH_2O \qquad (1)$$

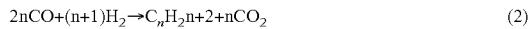

$$2nCO + (n+1)H_2 \rightarrow C_nH_{2n+2} + nCO_2 \qquad (2)$$

$$CO + H_2O \rightarrow CO_2 + H_2 \qquad (3)$$

The Fischer-Tropsch synthesis is well-poised to serve as an alternative source of middle distillates because the reactant gas mixture utilized for the reaction, synthesis gas, is a mixture of carbon monoxide and hydrogen obtained by the conversion of carbonaceous or hydrocarbonaceous materials e.g. coal or, more commonly, natural gas; both resources being abundant compared to existing and predicted petroleum reserves. This conversion of natural gas to usable liquid fuels presents itself as an attractive synthetic route incorporating synthesis gas. Natural gas can be found as pockets of stranded gas, and on-site conversion to easily transportable and valuable liquid fuels represents a more efficient utilization of abundant natural gas. Moreover, synthesis gas can be produced from a variety of processes. Synthesis gas can be obtained from a gaseous hydrocarbon, such as methane, or from any mixtures of gaseous hydrocarbons such as in natural gas, by means of steam reforming, auto-thermal reforming, dry reforming with carbon dioxide, advanced gas heated reforming, partial oxidation, catalytic partial oxidation, or other processes known in the art. The synthesis gas so produced and the fuels eventually produced from it are substantially free of sulfurous impurities that commonly require costly removal from comparable oil and coal derived fuels.

The nature of the product mixture, e.g., distribution of molecular weights and product yield, produced from the Fischer-Tropsch process, is profoundly influenced by several reaction variables including, but not limited to, composition and morphology of the catalyst, conditions of temperature and pressure within the reactor, and the molar ratio of the gases in the reactant gas mixture.

The Fischer-Tropsch product stream contains hydrocarbons having a range of numbers of carbon atoms, and thus having a range of molecular weights. Although it is possible to directly produce middle distillate fractions containing $C_{13}$–$C_{20}$ hydrocarbons, an alternative is to adjust reactor conditions to favor the production of higher molecular weight products, such as $C_{21+}$ hydrocarbons which tend to be waxy solids at room temperature, commonly referred to as Fischer-Tropsch wax. Subsequent processing of a Fischer-Tropsch wax may produce diesel fuel via distillation and hydrocracking processes.

Typically, in the Fischer-Tropsch synthesis, the distribution of weights that is observed can be described by likening the Fischer-Tropsch reaction to a polymerization reaction with an Anderson-Schulz-Flory chain growth probability (alpha value) that is independent of the number of carbon atoms in the lengthening molecule. The alpha value is typically interpreted as the molar ratio of $C_{n+1}$ product to $C_n$ product.

Catalysts for the Fischer-Tropsch process typically comprise a metal selected from the group consisting of cobalt, iron, ruthenium, or other Groups 8, 9, or 10 metals from the Periodic Table of the Elements (according to the New Notation IUPAC Form as illustrated in, for example, the *CRC Handbook of Chemistry and Physics*, 82$^{nd}$ Edition, 2001–2002; said reference being the standard herein and throughout); and, optionally, at least one, and possibly more than one, promoter selected from the group consisting of the alkali metals, the alkaline earth metals, the lanthanides, copper, thorium, zirconium, rhenium, titanium, elements from Groups 13–17 of the Periodic Table; and may be supported on some carrier or unsupported.

It is well known that iron-based Fischer-Tropsch catalysts have a comparatively high water-gas shift activity, so as to ultimately produce comparatively small amount of water vapor. By contrast, reactors employing cobalt-based Fischer-Tropsch catalysts tend to produce significantly higher quantities of water vapor, owing to the relatively low water gas shift activity of the cobalt catalysts employed. Thus, reactors utilizing cobalt-based catalysts tend to produce significant amounts of gaseous water as a by-product.

Some cobalt-based Fischer-Tropsch processes place exceptionally high demands upon the mechanical, thermal and chemical properties of catalyst particles. Under reaction temperatures (200–300° C.) and pressures (20–30 bar) commonly found in cobalt-based, Fischer-Tropsch wax producing reactors, the water vapor so generated can exert a considerable water vapor partial pressure. Under these conditions, catalyst support particles, such as those comprising gamma-alumina for example, can degrade and disintegrate, providing ample opportunity for the active catalytic metal to be removed from the catalytic process via erosion and attrition processes. In addition, the alumina may react with cobalt metal to form cobalt aluminate spinels, which bind the cobalt into oxidized forms and prevent their participation in the catalytic process as zero valent metals.

Catalyst supports used in the Fischer-Tropsch synthesis are typically porous, refractory inorganic oxides. A key function of a catalyst support particle is the provision of a suitable framework by which the catalytically active metals can be deposited onto the surface of the support particle as numerous, well-dispersed clusters, thereby making the most economic use of the oftentimes costly active catalytic metal and providing for an extensive surface over which chemical reaction may occur. Thus, many techniques of catalyst synthesis strive to create support particles of high porosity and surface area upon which can be deposited the active catalytic metal. In addition to influencing the nature and concentration of active catalytic sites, properties of the catalyst support, such as surface area, pore volume, pore size and porosity, can also affect the diffusion of reactants and products to and from the active catalytic site, respectively.

The nature of the catalyst support can contribute to the effective lifetime of a catalyst, herein defined as the length of time over which the catalyst can continue to catalyze a given specified process at a practicable rate. Catalyst lifetime is governed by diverse, interrelated processes including catalyst deactivation, catalyst attrition and catalyst support degradation. Deactivation can be thought of generally as the partial or total attenuation of the ability of the catalyst to mediate the specific chemical transformation of interest and may comprise processes such as oxidation of catalytically active metal or sintering wherein distinct catalytic metal sites cluster together and begin to grow into a single crystal; and, clogging of pores in the support structure which prevents the diffusion of reactants and products to and from the active catalytic sites. Catalyst attrition can be defined as the loss of catalytic metal to the surrounding medium and eventual removal from the catalytic cycle while degradation is defined herein as a significant change in support particle morphology in response to reactor conditions, such as mechanical stress, high temperature or high water vapor partial pressure.

Gamma-alumina is a particularly important refractory, inorganic oxide of widespread technological importance in the field of catalysis, often serving as a catalyst support. Gamma-alumina is an exceptionally good choice for catalytic applications because of a defect spinel crystal lattice that imparts to it a structure that is both open and capable of high surface area. Moreover, the defect spinel structure has vacant cation sites giving the gamma-alumina some unique properties. Gamma-alumina constitutes a part of the series known as the activated, transition aluminas, so-called because it is one of a series of aluminas that can undergo transition to different polymorphs. The oxides of aluminum and the corresponding hydrates, can be classified according to the arrangement of the crystal lattice; gamma-alumina (gamma-$Al_2O_3$) being part of the gamma series by virtue of a cubic close packed (ccp) arrangement of oxygen groups. Some transitions within a series are known; for example, low-temperature dehydration of an alumina trihydrate (gibbsite, gamma-$Al(OH)_3$) at 100° C. provides an alumina monohydrate (boehmite, gamma-AlO(OH)). Continued dehydration at temperatures below 450° C. in the gamma series leads to the transformation from boehmite to the completely dehydrated gamma-$Al_2O_3$. Further heating may result in a slow and continuous loss of surface area and a slow conversion to other polymorphs having much lower surface areas. Higher temperature treatment ultimately provides alpha-alumina (alpha-$Al_2O_3$), a denser, harder oxide of aluminum often used in abrasives and refractories; the structure of alpha-$Al_2O_3$ being less well-suited to certain catalytic applications, such as in the Fischer-Tropsch process, because of a closed crystal lattice which imparts a relatively low surface area to the catalyst particles.

Reactors that produce water vapor at high temperature and high water vapor partial pressure, such as for example, cobalt-based Fischer-Tropsch reactors producing a waxy, paraffinic hydrocarbon product, provide environments that challenge the hydrothermal and acid stability of gamma-$Al_2O_3$ supports; these supports being prone to degradation, fragmentation, phase transition or other processes that compromise the ability of the support material to adequately support catalytic metals. Thus, preparing a catalyst supported on gamma-$Al_2O_3$ of sufficient stability for use in protracted steam-producing Fischer-Tropsch reactors remains an important problem in the art.

The problem of contamination of a waxy Fischer-Tropsch product with catalyst ultra fines has been addressed in International Application WO 99/42214 wherein a catalyst support made by introducing Si, Zr, Cu, Zn, Mn, Ba, Co, Ni and/or Li as a modifying component onto and/or into an untreated catalyst support is disclosed. In particular, the modifying component is chemically bonded to the particle surfaces and/or support frameworks of the particles to suppress the solubility of the catalyst support, and prevent the factors which contribute to high catalyst attrition.

Similarly, U.S. Pat. No. 6,255,358 B1 discloses a highly stable cobalt on alumina catalyst wherein the catalyst comprises a gamma-alumina support doped with lanthanum oxide, barium oxide or a combination thereof to increase the thermal stability of the catalyst in a slurry bubble column reactor; and wherein the catalyst support employed is preferably a lanthanum or barium doped gamma-alumina support.

U.S. Pat. Nos. 5,102,851 and 5,116,879 disclose a catalyst for converting synthesis gas into a mixture of predominately paraffinic hydrocarbons wherein the catalyst includes catalytically active amounts of cobalt and a loading-insensitive second metal selected from the group consisting of platinum, iridium, rhodium and mixtures thereof composited on an alumina support wherein gamma-alumina is preferred, but a number of alumina structures, for examples, eta-alumina, xi-alumina, theta-alumina, delta-alumina, kappa-alumina, boehmite, and pseudo-boehmite can all be used as supports.

Co-pending U.S. Provisional Patent Application 60/419, 021 filed on Oct. 16, 2002 and incorporated herein by reference relates to a stabilized transition alumina catalyst support of high hydrothermal stability and methods of making such a support wherein the support comprises at least one structural stabilizer selected from the group consisting of boron (B), magnesium (Mg), silicon (Si), calcium (Ca), titanium (Ti), chromium (Cr), manganese (Mn), iron (Fe), cobalt (Co), nickel (Ni), copper (Cu), zinc (Zn), gallium (Ga), strontium (Sr), zirconium (Zr), barium (Ba), selenium (Se) and the lanthanides (Lns). Catalysts made using such a support are further disclosed.

Although some in the art have attempted to solve the general problem of catalyst attrition in Fischer-Tropsch catalysts, none have offered a completely satisfactory solution to the specific problem of creating catalysts that can successfully and totally withstand the conditions within a cobalt-based Fischer-Tropsch reactor producing a hydrocarbon product comprising paraffinic wax as well as substantial quantities of high-pressure and high-temperature water vapor. In particular, alumina supports for cobalt catalysts used in such reactor, that are highly resistant to physical and chemical changes in the face of extreme acidic, hydrothermal and mechanical stresses, are still in demand within the art; the problem having not been completely solved to date. More particularly, the issues of loss of catalytic metal, collapsed particle structure, sintering of catalytically active metals including cobalt and/or platinum, and formation of cobalt-aluminate spinels in the catalysts of interest remain extant within the art.

SUMMARY OF THE INVENTION

The present invention pertains to a Fischer-Tropsch catalyst comprising at least one catalytically active metal on an alumina support. In particular, the current invention addresses the stability and durability of catalyst supports and catalysts made therefrom for use in Fischer-Tropsch reactors producing water vapor and operating at high temperatures, high pressures, and acidic conditions.

According to one embodiment of the present invention, a surface coverage comprising a rare-earth oxide coating at least partially a transition alumina comprising delta-alumina, theta-alumina, and any combination thereof serves as a protective layer to produce an improved support for Fischer-Tropsch catalysts used in reactors producing high-pressure, high-temperature water vapor. The catalyst support thus obtained tends to be acid resistant because the amphoteric alumina is protected from the acidic conditions found in Fischer-Tropsch reactors by an acid-resistant surface layer comprising a rare-earth oxide, which covers the alumina at least partially. Furthermore, alumina comprising delta-alumina, theta-alumina, and any combination thereof, is more resistant to acid and phase deterioration under hydrothermal conditions than gamma-alumina. Moreover, according to one embodiment, crystallites of a catalytically active metal are arranged on the surface layer comprising at least one rare-earth oxide and covering an alumina support at least partially. For example, when the catalytically active metal is cobalt, interactions between cobalt and the alumina support are minimized and therefore formation of cobalt aluminates of spinel or pseudo-spinel structure is reduced, since most of the cobalt would be supported on a surface layer comprising at least one rare-earth oxide and not directly supported on alumina.

In addition, according to one embodiment, there is an expectation that a less acidic surface layer may encourage the formation of larger and more uniform crystallites of a catalytically active metal; thus, resulting in facile reduction during reductive pretreatment and improved dispersion of the catalytically active metal. The Fischer-Tropsch catalysts made from the catalyst supports of the present invention is expected to provide excellent stability, high activity and extended catalyst lifetimes, while maintaining desirable selectivity, attrition resistance, density, pore structure and particle size. In addition, promoters may be deposited onto a surface layer comprising a rare-earth oxide. Such deposited promoters may also maintain an improved dispersion.

In particular, the present invention discloses, in one aspect, a method of making a catalyst support comprising applying a compound of a rare-earth metal to an aluminum-comprising material; drying the rare-earth modified alumina precursor; and calcining the dried rare-earth modified alumina precursor in a manner effective for converting at least a portion of the aluminum-comprising material to an alumina support comprising at least one alumina phase selected from the group consisting of delta-alumina, theta-alumina, and any combination thereof; and creating a surface coverage comprising an oxide of said rare-earth metal, said coverage at least coating partially the alumina phase. Preferably the rare-earth metal is essentially trivalent. A preferred method for applying a compound of a rare-earth metal to the aluminum-comprising material is impregnation. The impregnation can be performed at an ambient pressure or sub-ambient pressure. More preferably, the impregnation technique is incipient wetness impregnation. According to one embodiment, the aluminum-comprising material may comprise at least one material selected from the group consisting of an oxide of aluminum, a salt of aluminum, an alkoxide of aluminum, a hydroxide of aluminum and any combination thereof. According to an alternate embodiment, an aluminum-comprising material may comprise at least one material selected from the group consisting of pseudo-boehmite, boehmite, bayerite, gibbsite, and any combinations thereof. The boehmite crystallites may be fine or coarse. According to yet another embodiment, the aluminum-comprising material comprises at least one polymorph of alumina selected from the group consisting of gamma-alumina, theta-alumina, delta-alumina, eta-alumina, rho-alumina, chi-alumina, kappa-alumina, and any combinations thereof. In a preferred embodiment, the aluminum-comprising material comprises mostly gamma-alumina.

In another aspect, the present invention discloses a catalyst support comprising a surface coverage comprising an oxide of at least one rare-earth metal, said coverage coating at least partially the alumina; optionally gamma-alumina; and at least one alumina phase selected from the group consisting of delta-alumina, theta-alumina and any combination thereof. Preferably, the rare-earth metal is essentially trivalent. In preferred embodiments, the surface coverage coats the alumina phase completely and comprises at least one monolayer of a trivalent rare-earth metal oxide.

In another aspect, a method of making a Fischer-Tropsch catalyst is disclosed wherein the method comprises applying a compound of at least one catalytically active metal to the catalyst support of the present invention to form a catalyst precursor; optionally, applying a compound of at least one promoter; calcining the catalyst precursor; and reducing the calcined catalyst precursor. The method may further include embedding the reduced catalyst in a protective oil or solid hydrocarbons such as wax. This embedding is done to minimize oxidation of the catalyst by preventing or minimizing contact with ambient oxygen, and thereby maintaining the active metal in its reduced state. The present invention further provides, in another aspect, a Fischer-Tropsch catalyst made according to the present method.

In yet another aspect, the present invention discloses a Fischer-Tropsch catalyst comprising at least one catalytically active metal; optionally, at least one promoter; and a rare-earth oxide modified catalyst support including at least one alumina material comprising an alumina phase selected from the group consisting of delta-alumina, theta-alumina, and any combination thereof; and optionally gamma-alumina; and a surface coverage comprising an oxide of at least one rare-earth metal, wherein said coverage coats the alumina material at least partially. The preferred rare-earth metal is essentially trivalent.

In another aspect of the current invention is disclosed a process for converting synthesis gas to hydrocarbons wherein the process comprises converting a reactant gas mixture comprising synthesis gas under conditions effective for producing a product mixture comprising waxy paraffinic hydrocarbons with a catalyst comprising at least one catalytically active metal; optionally, at least one promoter; and a rare-earth oxide modified catalyst support including at least one alumina material comprising an alumina phase selected from the group consisting of delta-alumina, theta-alumina, and any combination thereof; and optionally gamma-alumina; and a surface coverage comprising an oxide of at least one rare-earth metal, wherein said coverage coats the alumina material at least partially.

BRIEF DESCRIPTION OF THE DRAWINGS

For a detailed description of the preferred embodiments of the present invention, reference will now be made to the accompanying Figures, wherein.

DETAILED DESCRIPTION OF THE INVENTION

Figure 1:
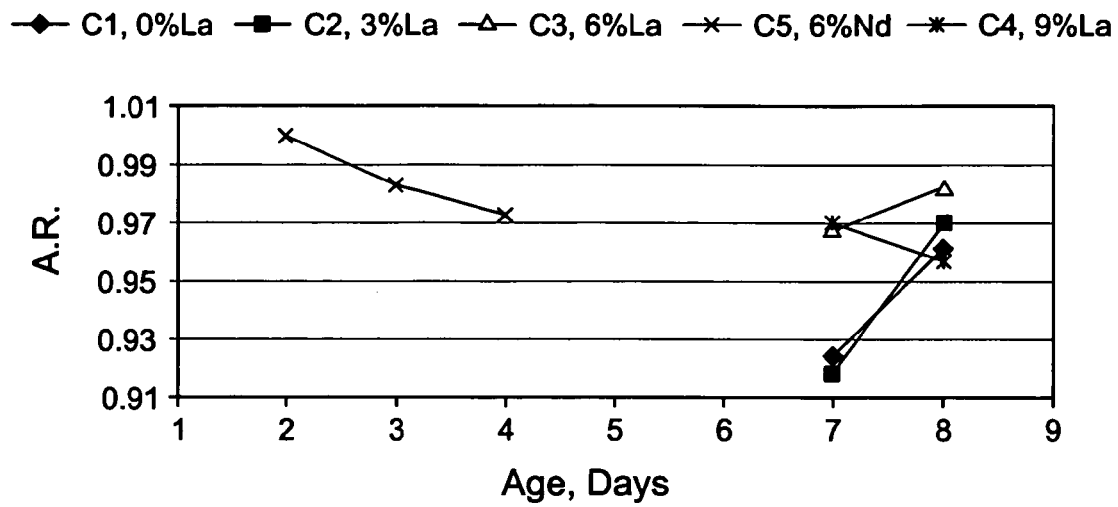
FIG. 1 is a plot illustrating the retention of catalytic activity (A.R.) for different Ru-promoted cobalt-based catalysts on unmodified, Nd-modified and La-modified alumina supports.

The present invention discloses a method of making a catalyst support comprising applying a compound of a rare-earth metal to an aluminum-comprising material to afford a rare-earth modified alumina precursor; drying the rare-earth modified alumina precursor to afford a dried rare-earth modified alumina precursor; and calcining the dried rare-earth modified alumina precursor in a manner effective for converting at least a portion of the aluminum-comprising material to an alumina support comprising at least one alumina phase selected from the group consisting of delta-alumina, theta-alumina, and any combination thereof; and creating a surface coverage comprising an oxide of said rare-earth metal, wherein the rare-earth metal is essentially trivalent, and wherein the surface coverage coats the alumina at least partially.

The aluminum-comprising material of the present method may be selected from one of the many chemical compounds that are comprised of aluminum, either in an elemental form or part of a chemical compound. Preferably, the aluminum-comprising material comprises at least one material selected from the group consisting of an oxide of aluminum, a salt of aluminum, an alkoxide of aluminum, a hydroxide of aluminum, and any combinations thereof. Some aluminum-based minerals find particular utility in the present method due to their abundance, ease of synthesis, low cost and/or other properties, which make them particularly suitable for use in the present method. More preferably, the aluminum-comprising material comprises at least one material selected from the group consisting of pseudo-boehmite, boehmite, bayerite, gibbsite, gamma-alumina, and any combinations thereof. When boehmite is the aluminum-comprising material, the boehmite may comprise crystallites of boehmite. Boehmite crystallites can be coarse or fine. The most preferred aluminum-comprising material comprises essentially gamma-alumina.

The gamma-alumina, which can be used as the aluminum-comprising material in the present method of preparation of the catalyst support, may be obtained commercially or synthesized using any one of a number of methods known to those skilled in the art. For example, gamma-alumina may be obtained by the Zeigler higher alcohol synthesis process through hydrolysis of aluminum alkoxide, or by hydrolysis of organoaluminum compounds, each of which is followed by a heat treatment. Gamma-alumina is preferably obtained via the former process through precipitation of boehmite or pseudo-boehmite by hydrolysis of an aluminum alkoxide followed by heat treatment. This particular alumina, which is a byproduct from the Ziegler reaction as disclosed in U.S. Pat. No. 2,892,858, has been described in U.S. Pat. Nos. 3,852,190 and 4,012,313, incorporated herein by reference. Any suitable aluminum alkoxide or combination thereof may be used with the current method. Suitable alkoxides of aluminum include, but are not limited to, the alkoxides comprising methyl, ethyl, propyl, and isopropyl groups and the alkoxides featuring any combinations of those groups, such as, for example, trimethoxyaluminum, triethoxyaluminum, tripropoxyaluminum, dimethoxyethoxyaluminum and triisopropoxyaluminum.

It will be understood by-those skilled in the art that trace amounts of certain contaminants may be present in the aluminum-comprising material without appreciably interfering with its use in the present method. For example, when the aluminum-comprising material comprises gamma-alumina, no more than about 0.1% by weight $Na_2O$ is preferred; more preferably no more than about 0.01% by weight $Na_2O$; and most preferably no more than about 0.005% by weight.

The gamma-alumina used as the aluminum-comprising material in the present method of preparation of the catalyst support possesses a desired profile of physical characteristics with respect to, say, morphology and pore structure. Preferably, the gamma-alumina of the present method possesses a surface area between about 100 m$^2$/g and about 300 m$^2$/g; more preferably between about 120 m$^2$/g and about 300 m$^2$/g, but most preferably between about 120 m$^2$/g and about 220 m$^2$/g. The gamma-alumina of the present method further possesses a pore volume of at least about 0.2 ml/g.

The present method still further comprises applying a compound of a rare-earth metal. It should be noted that within this specification the terms rare-earth, rare-earth element and rare-earth metal are equivalent and refer to any one of the following elements: scandium (Sc), yttrium (Y), and the lanthanides including lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). The rare-earth metal as used in the present invention is essentially trivalent, and is preferably selected among yttrium, lanthanum, praseodymium, neodymium, samarium, and gadolinium. More preferably, the trivalent rare-earth metal is lanthanum, praseodymium, or neodymium.

According to the current invention, applying a compound of a rare-earth metal on an aluminum-comprising material may be carried out by kneading a compound of a rare-earth metal with the aluminum-comprising material, or preferably, by applying a solution of a compound of a rare-earth metal to the aluminum-comprising material, to generate a rare-earth modified alumina precursor. It should be understood that it is envisioned that more than one compound of a rare-earth metal can be applied to the aluminum-containing compound in the same application step or in different application steps to prepare the catalyst support. When the application step is done by applying a rare-earth metal solution to the aluminum-comprising material, the solution may comprise several compounds of different rare-earth metals. The compounds of a rare-earth metal may be salts that comprise a rare-earth metal cation and a counterion, such as the anion and any hydrated form of the anion. Examples include for example nitrate, any alkanoate such as octanoate, oxalate, carbonate, acetate, acetylacetonate, any halide, and sulfate. The more suitable compounds of a rare-earth metal include compounds of the rare-earth elements soluble in a suitable solvent such as water, or an organic solvent like toluene, methanol, acetone, ethanol, or mixtures thereof. The compound of the rare-earth element is preferably soluble in water. Particularly, the preferred compounds comprise the hydrated nitrate salts of a rare-earth metal. Although any one or combination of the rare-earth elements may comprise the rare-earth compound, at least one metal of the compound of a rare-earth metal is trivalent, and is preferably selected from the group consisting of yttrium, lanthanum, praseodymium, neodymium, samarium, and gadolinium.

Although any suitable method may be used to apply a compound of a rare-earth metal, impregnation is a preferred method according to one embodiment. The impregnation can be performed under ambient pressure or below ambient (i.e., under sub-ambient) pressure. Also, according to this embodiment, incipient wetness impregnation is a particularly preferred technique of impregnation chosen from the many suitable techniques of impregnation available and known to those skilled in the art.

The current method of preparing the catalyst support further comprises drying the rare-earth modified alumina precursor under suitable conditions to afford a dried rare-earth modified alumina precursor. Suitable conditions for drying the rare-earth modified alumina precursor will be those sufficient for driving off essentially all of the solvent or solvents used in the previous application step. Preferred conditions for drying the rare-earth modified alumina precursor comprise a temperature of at least 80° C.

The current method of preparing the catalyst support still further comprises calcining the dried rare-earth modified alumina precursor in a manner effective for creating a surface coverage comprising an oxide of said rare-earth metal, which coats the alumina at least partially. According to the current method, calcining conditions will be effective for converting the rare-earth metal compound into an oxide of the rare-earth metal; and decomposing and/or removing the counterion of the rare-earth metal compound, when the compound is a salt. Preferably, the dried rare-earth modified alumina precursor is calcined in an oxidizing, reducing or inert atmosphere at a temperature between about 800° C. and about 1,400° C., more preferably between about 900° C. and about 1,300° C.; yet more preferably between about 1,000° C. and about 1,300° C. An inert atmosphere is an atmosphere that is unreactive at the conditions employed in the calcination. An exemplary inert atmosphere in this context includes an atmosphere including nitrogen, helium, or argon. Preferably, calcining for converting the rare-earth metal compound into an oxide of the rare-earth metal is done under an oxidizing atmosphere. Also preferably, calcining the dried rare-earth modified alumina precursor is carried out in a manner effective for creating a surface coverage comprising an oxide of at least one rare-earth metal which coats the alumina material at least partially. In preferred embodiments, the surface coverage is between about 0.2 nm and about 0.5 nm in thickness. According to one preferred embodiment, calcining is effective for creating a rare-earth oxide surface coverage that coats the alumina at least partially. In another preferred embodiment, calcining is effective for creating a rare-earth oxide surface coverage that coats the alumina completely.

Calcining conditions will be further effective for converting at least a portion of the aluminum-comprising material to an alumina support comprising at least one alumina phase selected from the group consisting of delta-alumina, theta-alumina, and any combination thereof. According to one embodiment, calcining conditions are effective for providing a transition alumina that particularly comprises theta-alumina. According to the present invention, an alumina support comprising at least one alumina phase selected from the group consisting of delta-alumina, theta-alumina, and any combination thereof, is more resistant to morphological changes than gamma-alumina under reaction conditions commonly encountered in Fischer-Tropsch reactors, e.g. high temperature, high pressure and high water vapor partial pressure. According to another embodiment, calcining is effective for converting at least 20% of the aluminum-comprising material to an alumina support comprising at least one alumina phase selected from the group consisting of delta-alumina, theta-alumina, and any combination thereof. According to one preferred embodiment, calcining is effective for converting essentially all of the aluminum-comprising material to an alumina support comprising at least one alumina phase selected from the group consisting of delta-alumina, theta-alumina and any combination thereof. According to another preferred embodiment, calcining is effective for converting essentially all of the aluminum-comprising material to an alumina support comprising essentially theta-alumina. Calcination conditions may also be effective for converting a portion of the aluminum-comprising material to an alumina support comprising gamma-alumina. In addition calcination conditions may also be effective for converting a small portion (i.e., less than 10%) of the aluminum-comprising material to an alumina support comprising alpha-alumina.

It should be understood that, when two or more rare-earth metals are applied to the aluminum-containing compound, at least one of the rare-earth metals is essentially trivalent, and the applications of compounds of different rare-earth metals could be done simultaneously or sequentially. When sequential applications of compounds of different rare-earth metals are done, it is preferred that a compound of a rare-earth metal applied in the first application comprises a rare-earth metal which is essentially trivalent. Additionally, any subsequent application of a compound of another rare-earth metal is preferably performed after the calcination step. Although any application technique can be used for any subsequent application step, impregnation, most particularly incipient wetness impregnation, is the preferred technique. Therefore, the method of making the catalyst support can further comprise applying a compound of a second rare-earth metal to a catalyst support comprising at least a first rare-earth metal oxide; then drying and calcining. The drying conditions are similar to those described above; but the calcination is preferably done at a lower temperature, between about 300° C. and about 900° C., more preferably between about 400° C. and about 800° C.

Optionally, the method of making the catalyst support can further comprise applying a structural modifier to the alumina support. The structural modifier preferably is a divalent, trivalent or tetravalent metal selected from Groups 1–17 of the Periodic Table of Elements. Preferably the structural modifier comprises an element selected from the group consisting of boron, magnesium, silicon, calcium, titanium, chromium, manganese, iron, cobalt, nickel, copper, zinc, gallium, strontium, zirconium, molybdenum, tin, and barium.

In yet another aspect, the present invention discloses a rare-earth oxide modified catalyst support comprising a surface coverage comprising an oxide of at least one trivalent rare-earth metal; and at least one alumina phase selected from the group consisting of theta-alumina, delta-alumina, eta-alumina, rho-alumina, chi-alumina, kappa-alumina, and any combinations thereof, wherein said coverage coats the alumina at least partially. Optionally, the rare-earth oxide modified catalyst support may further comprise gamma-alumina.

The present catalyst support comprises at least one alumina phase. The alumina phases include the polymorphs of alumina denoted gamma-alumina, theta-alumina, delta-alumina, eta-alumina, rho-alumina, chi-alumina, and kappa-alumina. In the catalyst support of the current invention the alumina may comprise any one or combination of the above crystallographic polymorphs, with the exception that gamma-alumina, when present in the catalyst support, is present in combination with at least one other transition alumina phase. Preferably, the support comprises at least one alumina phase selected from the group consisting of delta-alumina, theta-alumina, and any combinations thereof, and optionally, gamma-alumina. The support may include any combination of theta-delta-alumina phases, any combination of gamma-delta-alumina phases, any combination of gamma-theta-alumina phases, or any combinations of gamma-delta-theta-alumina phases. Such combination of alumina phases can be achieved by phase transformation under appropriate temperature conditions from a single aluminum-comprising material, and/or by physically mixing two or more alumina phases together, each alumina phase being obtained from similar or different aluminum-comprising materials. More preferred, however, is a support comprising at least one alumina phase selected from the group consisting of delta-alumina, theta-alumina, and any combination thereof. According to one embodiment, the support comprises at least 20% delta-alumina, or at least 20% theta-alumina, or at least 20% of combined delta-theta-alumina. In a preferred embodiment, the support comprises mostly theta-alumina.

The present catalyst support further comprises a surface coverage comprising an oxide of at least one rare-earth metal. Preferably, the rare-earth metal is essentially trivalent, and is selected from the group consisting of yttrium, lanthanum, praseodymium, neodymium, samarium, and gadolinium. Preferably, the rare-earth metal is present in an amount between about 1% and about 15% by weight of metal to final weight of modified support; more preferably, in an amount between about 3% and about 10% by weight of metal to final weight of modified support; and most preferably, in an amount between about 4% and about 7% by weight of metal to final weight of modified support. The present catalyst support may comprise oxides of more than one rare-earth metal. When two or more rare-earth metals are used, it is preferred that at least one rare-earth metal is essentially trivalent.

The rare-earth oxide modified catalyst support may yet still further comprise a structural modifier. The structural modifier preferably comprises an element selected from Groups 1–17; and preferably, the structural modifier comprises one element selected from the group consisting of boron, magnesium, silicon, calcium, titanium, chromium, manganese, iron, cobalt, nickel, copper, zinc, gallium, strontium, zirconium, molybdenum, tin, and barium. The amount of structural modifier is between about 0.1% by weight and about 5% by weight of the final weight of the modified support.

According to one embodiment of the present catalyst support, the surface coverage comprising an oxide of at least one rare-earth metal partially coats the alumina. In another embodiment, the rare-earth metal oxide surface coverage completely coats the alumina. According to one other embodiment, the rare-earth metal oxide surface coverage may comprise one monolayer of a rare-earth metal oxide, which has a thickness equal to about that of the size of the rare-earth metal oxide species. The surface coverage comprising an oxide of at least one rare-earth metal preferably has a thickness of at least about 0.2 nanometer (nm).

According to one embodiment, the rare-earth metal oxide surface coverage may comprise two atomic layers of rare-earth metal oxide(s). Further, according to this embodiment, the first atomic layer preferably completely covers the alumina phase while the second atomic layer covers at least partially the first layer.

The rare-earth oxide modified catalyst support is expected to have a desirable combination of physical characteristics. Thus, the present support is preferably characterized by a surface area between about 40 $m^2/g$ and about 150 $m^2/g$; more preferably, between about 70 $m^2/g$ and about 130 $m^2/g$. The present support is further characterized by a pore volume preferably between about 0.1 $cm^3/g$ and about 0.5 $cm^3/g$; more preferably between about 0.2 $cm^3/g$ and about 0.5 $cm^3/g$.

The present support is yet further characterized by its resistance to phase transformation. In particular, it has been found that the present support when derived from gamma-alumina and modified with a rare-earth element undergoes a transformation to an alumina phase comprising delta-alumina, theta-alumina, or any combination thereof, at a temperature higher than that found for a corresponding transformation of an unmodified support derived from gamma-alumina.

The present support is still further characterized by its resistance to chemical and/or physical degradation. In particular, the support does not substantially degrade in the presence of mildly acidic conditions comprising a pH equal to or greater than about 4 at high pressure and elevated temperature.

In yet another aspect, the present invention discloses a Fischer-Tropsch catalyst. Fischer-Tropsch catalysts have been described in the Background section of this disclosure and will be defined herein as any catalyst capable of at least partially converting a gas comprising synthesis gas to hydrocarbons under suitable conditions of temperature and pressure. The Fischer-Tropsch catalyst of the present invention comprises at least one catalytically active metal; optionally, at least one promoter; and a rare-earth oxide modified catalyst support comprising a surface coverage comprising at least one rare-earth metal oxide; and an alumina material comprising at least one alumina phase selected from the group consisting of delta-alumina, theta-alumina, and any combination thereof; wherein the surface coverage coats the alumina material at least partially. Optionally the rare-earth oxide modified catalyst support may further comprise gamma-alumina.

The rare-earth oxide modified catalyst support of the present Fischer-Tropsch catalyst is substantially similar to that described above in connection with other aspects of this invention. Preferably the rare-earth metal is essentially trivalent. The rare-earth oxide modified support may further comprise a structural modifier wherein the structural modifier comprises one element selected from the group consisting of boron, magnesium, silicon, calcium, titanium, chromium, manganese, iron, cobalt, nickel, copper, zinc, gallium, strontium, zirconium, molybdenum, tin, and barium. When the rare-earth oxide modified support includes boron as a structural modifier, the catalyst preferably has a nominal composition including from about 0.025 wt % to about 2 wt % boron, more preferably from about 0.05 to about 1.8 wt % boron, and most preferably from about 0.075 wt % to about 1.5 wt % boron.

The Fischer-Tropsch catalyst of the present invention comprises at least one catalytically active metal. Numerous metals exist which may serve as the catalytically active metal, but one catalytically active metal is preferably selected from Groups 8, 9 or 10 of the Periodic Table of Elements. More preferably, one catalytically active metal is selected from the group consisting of iron, ruthenium, nickel and cobalt. In a particularly preferred embodiment, the catalytically active metal is cobalt. According to this embodiment, cobalt is preferably dispersed in crystallites of average size between about 1 nanometer (nm) and about 20 nm, more preferably between about 5 nm and about 20 nm. Also according to this embodiment, the cobalt crystallites are preferably arranged on the surface coverage comprising an oxide of at least one rare-earth metal. It will be appreciated by one of normal skill in the art that the catalytically active metals of the present invention are dispersed onto, into, throughout and within the pore structure, internal pore network and support particle surface of the catalyst support. Since the surface coverage may not completely coat the alumina, it is also envisioned that a few cobalt crystallites may be deposited directly on the alumina itself.

When the catalytically active metal is cobalt, it is present in an amount preferably between about 1% and about 50% by weight of metal to final weight of catalyst; more preferably between about 5% and about 40% by weight of metal to final weight of catalyst; most preferably between about 15% and about 35% by weight of metal to final weight of catalyst.

The Fischer-Tropsch catalyst of the present invention may optionally comprise at least one promoter. Preferred promoters for use in the Fischer-Tropsch catalyst of the present invention are selected from Groups 1–14 of the Periodic Table of Elements. When cobalt is the catalytically active metal; the promoter will preferably comprise at least one element selected from the group consisting of platinum, palladium, silver, ruthenium, iridium, rhodium, and rhenium. When the catalyst includes rhenium as a promoter, the rhenium is preferably present in the catalyst in an amount of from about 0.001 wt % to about 1 wt %, more preferably from about 0.01 wt % to about 1 wt %, and most preferably from about 0.1 wt % to about 0.5 wt %. When the catalyst includes ruthenium as a promoter, the ruthenium is preferably present in the catalyst in an amount from about 0.001 wt % to about 0.5 wt %, more preferably from about 0.01 wt % to about 0.5 wt %, most preferably from about 0.05 wt % to about 0.2 wt %. When the catalyst includes platinum as a promoter, the platinum is preferably present in the catalyst in an amount from about 0.0005 wt % to about 0.2 wt %, more preferably from about 0.001 wt % to about 0.1 wt %, and most preferably from about 0.01 wt % to about 0.08 wt %. When the catalyst includes palladium as promoter, the palladium is preferably present in the catalyst in an amount from about 0.001 wt % to about 1 wt %, more preferably from about 0.01 wt % to about 0.5 wt %, and most preferably from about 0.1 wt % to about 0.5 wt %. When the catalyst includes silver as a promoter, the catalyst preferably has a nominal composition including from about 0.05 wt % to about 5 wt % silver, more preferably from about 0.1 wt % to about 4 wt % silver, and most preferably from about 0.2 wt % to about 3 wt % silver. When iron is the catalytically active metal, the promoter will preferably comprise at least one element selected from the group consisting of sodium, copper, potassium, lithium and silver. When the iron catalyst includes potassium as promoter, the potassium is preferably present in the supported iron-based catalyst in an amount to provide a nominal catalyst composition including from about 0.1 wt % to about 10 wt % potassium. Alternatively or in combination, when the catalytic metal is iron, the catalyst includes copper as a promoter. When the iron catalyst includes copper as promoter, the copper is preferably present in the supported iron-based catalyst in an amount to provide a nominal catalyst composition containing from about 0.1 wt % to about 10 wt % copper. The silver is preferably present in the supported iron-based catalyst in an amount to provide a nominal catalyst composition containing from about 0.5 wt % to about 3 wt % Ag. Lithium is preferably present in the supported iron-based catalyst in an amount to provide a nominal catalyst composition containing from about 0.5 wt % to about 4 wt % Li.

Any suitable methods known in the art may be utilized to apply at least one compound of a catalytically active metal to a rare-earth oxide modified catalyst support to form a catalyst precursor; and calcining said catalyst precursor. For example, the rare-earth oxide modified support may be impregnated with the compound of a catalytically active metal, or the compound of a catalytically active metal may be precipitated onto the support material. When a promoter is used, a promoter-containing compound may be added to the support material in a separate step. Alternatively, a promoter-containing compound may be added to the support material concurrent with, e.g., in the same solution as, at least a portion of the compound of a catalytically active metal.

In a preferred embodiment, a catalyst precursor is prepared by impregnating the rare-earth oxide modified support with a solution containing a compound of a catalytically active metal. When a promoter is used, the solution may further contain a promoter-containing compound. Suitable solvents include water and organic solvents, e.g., toluene, methanol, and ethanol. Those skilled in the art would be able to select the most suitable solvent for a given compound. The compound of a catalytically active metal preferably is a salt of a catalytically active metal. Thus, one method of preparing a Fischer-Tropsch catalyst is by incipient wetness impregnation of the support material with an aqueous solution of a soluble metal salt such as nitrate, nitrate hexahydrate, acetate, or acetylacetonate. Preferably, the metal salt is dissolved in a minimal amount of solvent sufficient to fill the pores of the support. Alternatively, the rare-earth oxide modified support may be impregnated with a zero valent compound of a catalytically active metal, such as a cobalt carbonyl (e.g., $Co_2(CO)_8$, $Co_4(CO)_{12}$), or with a molten metal salt such as a molten metal nitrate (e.g., $Co(NO_3)_2 \cdot 6H_2O$). Preferably the catalytically active metal is selected from the group consisting of cobalt, iron, or combinations thereof. Most preferably the catalytically active metal is cobalt.

Those skilled in the art would be able to select the most suitable compound of a catalytically active metal for use in preparing a catalyst precursor. For example, suitable cobalt-containing precursor compounds include but are not limited to hydrated cobalt nitrate (e.g. cobalt nitrate hexahydrate), cobalt carbonyl, cobalt acetate, cobalt acetylacetonate, and cobalt oxalate. Hydrated cobalt nitrate and cobalt acetate are exemplary of cobalt-containing precursor compounds soluble in water. Cobalt oxalate is soluble in acids or acidic solutions. Cobalt acetate and cobalt acetylacetonate are exemplary of cobalt-containing precursor compounds soluble in an organic solvent. Suitable iron-containing precursor compounds include, for example, hydrated iron nitrate, iron carbonyl, iron acetate, iron acetylacetonate, and iron oxalate. Hydrated iron nitrate, iron acetate, and iron oxalate are exemplary of iron-containing compounds soluble in water. Iron carbonyl and iron acetylacetonate are exemplary of iron-containing compounds soluble in organic solvents.

Furthermore, those skilled in the art would be able to select the most suitable promoter-containing compound for use in preparing a catalyst precursor. Suitable rhenium-containing precursor compounds soluble in water are preferred and include, for example, perrhenic acid, ammonium perrhenate, rhenium pentacarbonyl chloride, and rhenium carbonyl. Suitable ruthenium-containing precursor compounds soluble in water include for example ruthenium carbonyl, hexaammineruthenium(III) chloride ($Ru(NH_3)_6Cl_3$), Ru(III)2,4-pentanedionoate, and ruthenium nitrosyl nitrate. Water-soluble ruthenium-containing precursor compounds are preferred. Suitable platinum-containing precursor compounds soluble in water include, for example, tetraammineplatinum(II) nitrate ($Pt(NH_3)_4(NO_3)_2$). Alternatively, the platinum-containing precursor may be soluble in an organic solvent, such as platinum acetylacetonate that is soluble in acetone. Suitable silver-containing precursor compounds soluble in water include, for example, silver nitrate ($AgNO_3$). Alternatively, the silver-containing precursor may be soluble in an organic solvent. Suitable palladium-containing precursor compounds include palladium dioxide ($PdO_2$), palladium nitrate ($Pd(NO_3)_2$), tetraamminepalladiuum(II) nitrate ($Pd(NH_3)_4(NO_3)_2$), or tetraamminepalladiuum(II) chloride hydrate ($Pd(NH_3)_4Cl_2 H_2O$). Suitable palladium-containing precursor compounds soluble in an organic solvent include palladium dioxide ($PdO_2$), which is soluble in acetone.

In addition, the method of making the catalyst may further include adding a structural modifier for the support. The structural modifier preferably is a divalent, trivalent or tetravalent metal selected from Groups 1–17 of the Periodic Table of Elements. Preferably the structural modifier comprises an element selected from the group consisting of boron, magnesium, silicon, calcium, titanium, chromium, manganese, iron, cobalt, nickel, copper, zinc, gallium, strontium, zirconium, molybdenum, tin, and barium. When the structural modifier is boron, the method may include applying a boron-containing compound. Suitable boron-containing compounds soluble in water include, for example, boric acid. Alternatively, the boron-containing compound may be soluble in an organic solvent. The boron application step is preferably performed concurrently with the application step of the catalytically active metal.

Subsequent to forming a catalyst precursor, the catalyst precursor may be subjected to a drying process. Drying the catalyst precursor is preferably performed at a temperature of from about 80 to 150° C. for a period of about 0.5 to 24 hours under atmospheric pressure or below atmospheric pressure such as under vacuum, in the presence of or under a flow of a gas comprising an inert gas such as nitrogen, air, or mixtures thereof. After the drying step, the catalyst precursor is calcined by heating preferably in an oxidizing atmosphere, to decompose at least a significant portion of the compound of the catalytically active metal to a metal oxide.

When the catalytic metal includes cobalt, the calcination preferably proceeds at a temperature of at least 200° C. and not more than about 600° C. The calcination temperature preferably ranges from about 220° C. to about 500° C., more preferably from about 240° C. to about 350° C. Preferably, the calcination is allowed to proceed for a period of about 0.5 to 24 hours at atmospheric pressure or below atmospheric pressure such as under vacuum. When a multi-step impregnation is required to form the catalyst precursor, calcination may be performed after each impregnation of the compound of the catalytically active metal and/or of the promoter-containing compound, and/or the structural modifier compound, or it may be performed after all impregnations have been completed. However, any calcination after the first calcination preferably proceeds at a temperature of not more than about 500° C., more preferably not more than about 450° C., and most preferably not more than about 350° C.

The impregnation, drying, and calcination steps may be repeated, for example, until the desired catalytic metal loading is obtained. Each impregnation step may include impregnation of any one or combinations of the compound of the catalytically active metal, the promoter-containing compound and the structural modifier compound. Each subsequent step of drying may proceed at a different temperature from any earlier steps of drying. Further, each subsequent step of calcination may proceed at a different temperature from any earlier steps of calcination.

Techniques of catalyst preparation typically include steps to reduce the catalytically active metal to a zero-valent state at some time prior to its use as a catalyst. Thus the resulting catalyst precursor, which includes a catalytic active metal with an optional promoter on a rare-earth oxide modified catalyst support, is desirably converted to an active catalyst before using it. The catalyst precursor can be activated via a reduction treatment in the presence of a reducing gas at an elevated temperature. The reducing gas preferably includes hydrogen ($H_2$). The reduction step is preferably performed at a temperature between 200° C. and 425° C. The reduction is preferably performed in a fluidized bed.

Since the reduced catalyst is sensitive to any oxidizing agent attack, especially from oxygen present in air or from water, protection for the catalyst in the reduced state from any oxidative attack is therefore critical, and special techniques of catalyst preparation reflect this sensitivity. One way to protect the catalyst's reduced state is to embed the catalyst particles in a coating material, for example oil or wax; thereby adding a barrier to permeation of oxidizing agent to the active reduced metal sites. The embedding step is typically done by coating the reduced catalyst in oil or hydrocarbon wax, most often although not necessarily, the hydrocarbon wax derived from a hydrocarbon synthesis process. Preferably, paraffin waxes from a Fischer-Tropsch process are used. Thus one can form the catalyst/wax mixture into pastilles, pellets or flakes; the cooled, solid wax protects the catalyst particles from oxidation by water, or by oxygen present in air.

According to some preferred embodiments, the present catalyst is used to practice a process for converting a reactant gas mixture comprising synthesis gas under suitable conditions to a product mixture comprising hydrocarbons. More preferably, the present catalyst is particularly useful for converting a reactant gas comprising synthesis gas under suitable conditions to a product mixture comprising waxy paraffinic hydrocarbons. As used herein, waxy paraffinic hydrocarbons refer to branched and straight-chain alkanes of at least 18 carbons, though most of the waxy paraffinic hydrocarbons according to the present invention will be straight-chain hydrocarbons. Also according to these embodiments, conditions suitable for converting a reactant gas mixture preferably comprise a temperature no less than about 160° C. and a pressure no less than about 5 atm. According to these embodiments, the catalyst is essentially free of aluminate spinels comprising the catalytically active metal before and/or during said process. Further, according to this embodiment, the formation of active metal aluminates of spinel or pseudo-spinel structure is prevented by using an alumina support comprising a surface coverage of at least one rare-earth metal oxide which tends to protect the alumina surface from active metal-alumina interactions before and/or during said process. Furthermore, according to this embodiment, at least one promoter undergoes no substantial deactivation before and/or during said process.

In a particularly preferred embodiment, the catalyst comprises cobalt and is used to practice any process for converting a reactant gas mixture comprising synthesis gas under suitable conditions to a product mixture comprising waxy paraffinic hydrocarbons. According to another preferred embodiment, conditions suitable for converting a reactant gas mixture preferably comprise a temperature no less than 160° C. and a pressure no less than 5 atm. According to this embodiment, the formation of cobalt aluminates of spinel or pseudo-spinel structure is prevented before and/or during the process. Further, according to this embodiment, the alumina support comprising delta-alumina, theta-alumina, or any combination thereof, retains its original phase upon exposure to said process. Furthermore, according to this embodiment, the promoter retains a majority of its original activity. That is, the promoter continues to have a beneficial effect upon the catalyst and/or synthesis despite exposure to the conditions within the reactor.

In another aspect of the current invention is disclosed a process for converting a reactant gas mixture comprising synthesis gas to a product mixture comprising waxy paraffinic hydrocarbons wherein the process comprises contacting said reactant gas mixture under conditions effective for producing a product mixture comprising waxy paraffinic hydrocarbons with a catalyst comprising at least one catalytically active metal; optionally, at least one promoter; and a catalyst support comprising an alumina comprising at least one alumina phase selected from the group consisting of delta-alumina, theta-alumina, and any combination thereof, and optionally gamma-alumina; and a surface coverage comprising at least one rare-earth metal oxide, wherein said coverage coats the alumina at least partially.

The catalyst employed in the present process is substantially similar to that described above in connection with previously described aspects of this invention.

The synthesis gas comprising a mixture of hydrogen ($H_2$) and carbon monoxide (CO) used in the present invention is obtainable from any source known to those skilled in the art, including, for example, by steam reforming, dry ($CO_2$) reforming, partial oxidation, or catalytic partial oxidation, of natural gas or light hydrocarbons of five carbons atoms or less: or by coal gasification; or from biomass. The synthesis gas used in the present process may further comprise smaller amounts of other gases that do not adversely affect the catalytic performance in the Fischer-Tropsch synthesis, including, but not limited to, carbon dioxide, nitrogen, and argon. However, contaminant gases capable of poisoning the hydrocarbon synthesis catalyst, such as those comprising compounds of nitrogen and sulfur (for example hydrogen cyanide, ammonia and hydrogen sulfide) should be kept to a minimum level. The synthesis gas used in the present process has a hydrogen to carbon monoxide ($H_2$:CO) molar ratio preferably between about 0.67:1 and about 5:1; more preferably between about 1:1 and about 3:1; and most preferably between about 1.4:1 and about 2.3:1.

The process of the present invention produces a product stream comprising a hydrocarbon wax. As used herein, a hydrocarbon wax refers to a mixture of hydrocarbons that exists as a solid at room temperature (e.g., about 20° C.) and ambient pressure (e.g., about 1 atm). It will be noted that although the mixture of hydrocarbons may comprise hydrocarbons that exist as liquids in the pure state the mixture will still retain the overall property of being a solid wax at room temperature and ambient pressure. Hydrocarbons that are solids at room temperature may have as few as 10 carbon atoms, such as, for example, the aromatic hydrocarbon naphthalene; linear paraffinic hydrocarbons typically require at least 18 carbon atoms to be solids at room temperature and ambient pressure.

In the current process of the present invention, the waxy paraffinic hydrocarbons preferably comprise primarily saturated linear hydrocarbons. As used herein, saturated hydrocarbons will refer to those hydrocarbons in which all carbon atoms present within the molecule are bonded to four other substituent atoms. Olefins, aromatics, and cycloalkenes are not saturated hydrocarbons. In another sense, said waxy paraffinic hydrocarbons preferably comprise primarily hydrocarbons having at least 18 carbon atoms.

The present process has a low selectivity for methane. The production of methane in a hydrocarbon synthesis process comes at the expense of efficiency in producing the desired waxy hydrocarbons. In addition, methane is of relatively low value compared to the higher molecular weight hydrocarbons. Also in a gas-to-liquid plant when the syngas is produced from methane or natural gas comprising primarily methane, if a Fischer-Tropsch process produces methane, then this constitutes returning to the starting material, and recycling of methane in a gas-to-liquid plant would require costly means. Thus methane production should be kept to a minimum and ideally should be entirely avoided. The present process succeeds in achieving a methane selectivity that is preferably not more than about 10 wt %. Indeed, the present process is of sufficiently high selectivity for higher molecular weigh hydrocarbons as to preferably provide a hydrocarbon product that is characterized by an alpha value of at least 0.85, preferably an alpha value greater than 0.87.

The process of the present invention may be carried out in one of many suitable reactors designed for such purpose and well known to those within the art. Particularly suitable reactors include fixed bed reactors, fluidized bed reactors, slurry bubble column reactors, bubble column slurry reactors, and ebullating bed reactors; but slurry bubble column reactors or bubble column slurry reactors are particularly preferred. Conditions within the reactor for the process of the present invention will be adjusted so as to obtain a desired combination of both reactivity and selectivity in the Fischer-Tropsch reaction. The process is typically run in a continuous mode. In this mode, the gas hourly space velocity (GHSV) through the reaction zone typically may range from about 50 to about 10,000 $hr^{-1}$, preferably from about 300 $hr^{-1}$ to about 2,000 $hr^{-1}$. The gas hourly space velocity is defined as the volume of the reactant gases per time per reaction zone volume. The volume of reactant gases is at standard pressure (101 kPa) and temperature (0° C.), and the reaction zone volume is defined by the portion of the reaction vessel volume where reaction takes place and which is occupied by a gaseous phase comprising reactants, products and/or inerts; a liquid phase comprising liquid/wax products and/or other liquids; and a solid phase comprising catalyst. The reaction zone temperature is typically in the range from about 160° C. to about 300° C. Preferably, the reaction zone is operated under conditions promoting conversion at temperatures from about 190° C. to about 260° C., more preferably from about 200° C. to about 230° C. The reaction zone pressure is typically in the range of about 80 psia (552 kPa) to about 1000 psia (6895 kPa), more preferably from 80 psia (552 kPa) to about 800 psia (5515 kPa), and still more preferably, from about 140 psia (965 kPa) to about 750 psia (5170 kPa). Most preferably, the reaction zone pressure is from about 250 psia (1720 kPa) to about 650 psia (4480 kPa).

As noted previously, degradation of catalysts due to processes ranging from support phase transformation to catalytic metals agglomeration within Fischer-Tropsch reactors operating at high temperature and high pressure and producing high-temperature, high-pressure steam is a pressing problem within the art. Another way in which the current catalysts of the present invention may become deactivated is through a process of spinel formation between the catalytically active metal and the underlying alumina support. As used herein, a spinel will refer to a distinct crystal formation bearing some similarity to the mineral spinel wherein said crystal formation is characterized by the presence of metal cations in differing oxidation states occupying tetrahedral and octahedral sites in a cubic close packed (ccp) array of the anion; inverse (or defect) and disordered spinels will also fall within this definition. In a steam-producing Fischer-Tropsch reactor operating at high temperature and high pressure, the acidic surface of an alumina support may cause catalytically active metals in oxidation state zero to form spinels or pseudo-spinels in which said catalytically active metal is present in a nonzero oxidation state, thus precluding the participation of the catalytically active metal in the catalytic cycle because said metal is only catalytically active in the zero oxidation state. When catalysts are deactivated by the deposition of carbonaceous deposits, they can be reactivated, rejuvenated, or regenerated by oxidative thermal treatment. When cobalt becomes partially oxidized to cobalt oxide, the conversion back to metallic cobalt is possible, as this oxidation process is reversible. However the formation of cobalt aluminates of spinel or pseudo-spinel structure cannot be reversed through a process of reductive calcination, low-temperature reduction, or combination thereof, and the cobalt in spinels can no longer participate in the reaction. Therefore, to prevent the formation of active metal aluminates of spinel or pseudo-spinel structure, the catalyst of the current invention is at least partially coated with a layer (or coverage) of a compound of a rare-earth metal that is not substantially acidic and does not tend to form spinels with catalytically active metals. Preferably, the catalyst of the current invention is substantially free of spinels incorporating said catalytically active metal upon exposure to the conditions of temperature and pressure found during the subject process.

As also mentioned hereinabove, under conditions of high temperature, high pressure and high-temperature and high-pressure water vapor, transition alumina supports may undergo phase transformations with a degradation in particle morphology and structural integrity permitting for catalyst attrition. The catalyst of the present invention comprises an alumina support that is resistant to phase transformation, upon exposure to the conditions of temperature and pressure found during the subject process. The catalyst of the present invention further comprises an optional dispersion of a reduction promoter selected from the noble metals; said dispersion being preferably conserved and resistant to agglomeration, sintering and/or burial in the support upon exposure to the conditions of temperature and pressure found during said process. It will also be a feature of the present catalyst when used in said process that the waxy hydrocarbon product shall not contain but a very low concentration of catalytically active metals that may have been lost due to catalyst attrition losses. The presence of metal fines in a waxy hydrocarbon product requires a particularly difficult purification as the exceedingly small size of the contaminating fines make removal of said fines difficult. In particular, the waxy hydrocarbons shall contain no more than about 100 ppm of catalytically active metal.

As used throughout this specification, a 'rare-earth metal which is essentially trivalent' means that the rare-earth metal oxide modifier of the alumina structure comprises mostly or entirely a corresponding rare-earth metal ion predominantly in the +3 oxidation state.

Throughout the specification, the terms 'layer' or 'coating' or 'coverage' are used interchangeably. In this context, these terms are meant to describe a discrete deposit of species of rare-earth metal oxide on an alumina surface. The terms 'layer' or 'coating' or 'coverage' do not imply to describe solely a uniform or continuous covering, where species are adjacent and always connecting each other. It is envisioned that the species of rare-earth metal oxide may partially cover the alumina surface, with possibly small gaps or significant distance between these species. Therefore there is a possibility that a fraction of the catalytically active metal atoms could still deposit directly on the portion of the alumina surface, which is not covered by species of rare-earth metal oxide. In addition, the terms 'layer' or 'coating' or 'coverage' do not imply a distinct crystallographic structure; in fact, it is much preferred by the inventor that the rare-earth oxide might not be present in a distinct crystallographic phase, and it is expected that such coverage does not show a separate bulk crystallographic phase visible by conventional X-Ray Diffraction.

Use of the term "optionally" with respect to any element of a claim is intended to mean that the subject element is required, or alternatively, is not required. Both alternatives are intended to be within the scope of the claim.

Without further elaboration, it is believed that one skilled in the art can, using the description herein, utilize the present invention to its fullest extent. The following EXAMPLES are to be construed as illustrative, and not as constraining the scope of the present invention in any way whatsoever.

EXAMPLES

Catalyst Supports

Example S1

Unmodified Alumina Support

Gamma-Alumina from SASOL (trademark Puralox SCCa 5/150) in microspheric particulates of average size of about 100 μm, was used as a control for comparison only, hereinafter identified as EXAMPLE S1. This alumina support is further characterized by a low sodium content (about 0.002 wt % $Na_2O$).

Examples S2–S6

Lanthanum-Modified Alumina Supports

The gamma-alumina starting material used to make the support of EXAMPLE S1 (Puralox SCCa 5/150 from SASOL) was used to make a series of lanthanum-modified alumina supports, hereinafter identified as EXAMPLES S2–S6. The modified supports of EXAMPLES S2–S6 were made by impregnation of gamma-alumina microspheres with an aqueous solution of a lanthanum (La) precursor, i.e., lanthanum nitrate hexahydrate [La(NO$_3$)$_3$ 6H$_2$O], to afford an impregnated support. Each impregnated support was then dried in an oven at 120° C. overnight, and calcined for 2 hours at 1,000° C., or at 1,100° C. The concentration of La(NO$_3$)$_3$ 6H$_2$O in the aqueous solution was selected in order to achieve different lanthanum loadings of 3; 4.5; 6; and 9% respectively, wherein the percentages are measured by weight of lanthanum in the final La-modified alumina support (La-Al$_2$O$_3$). The La content of the alumina support and the calcination temperature used for making EXAMPLES S2–S6 are listed in Table 1.

TABLE 1

| EXAMPLE # | La content in final support, wt % | Nd content in final support, wt % | Calcination temperature, ° C. |
|---|---|---|---|
| S2 | 3 | — | 1,000 |
| S3 | 4.5 | — | 1,000 |
| S4 | 6 | — | 1,000 |
| S5 | 6 | — | 1,100 |
| S6 | 9 | — | 1,000 |
| S7 | — | 6 | 1,000 |

Example S7

Neodymium-Modified Alumina Support

The modified support of EXAMPLE S7 was made according to the same procedure as described above for EXAMPLES S2–S6, with the exception that a neodymium (Nd) precursor was used instead of a lanthanum precursor. During the impregnation step, an aqueous solution of neodymium nitrate hexahydrate, [Nd(NO$_3$)$_3$ 6H$_2$O] was used to achieve a Nd loading of 6% by weight of neodymium in the final Nd-modified alumina support (Nd—Al$_2$O$_3$). The Nd loading and the calcination temperature used for making EXAMPLE S7 are listed in Table 1.

Catalysts

Ten catalyst samples were prepared using an impregnation technique with the various support EXAMPLES S1–S7 above.

Example C1

Cobalt-Based Catalysts with Ruthenium Promoter on Unmodified Alumina Support EXAMPLE C1 was prepared by impregnating the unmodified alumina support S1 with an aqueous solution containing boric acid, cobalt nitrate hexahydrate [Co(NO$_3$)$_2$ 6H$_2$O] and ruthenium nitrosyl nitrate [Ru(NO)(NO$_3$)$_3$]. The impregnation was conducted in three stages, with drying and calcining steps in between, so that each time only one-third of the aqueous Co—B—Ru solution was used. Drying was done in a rotary evaporator at about 82° C. for 16 hours. Calcination was performed at 240° C. for 5 hours. The concentrations of the boron, cobalt and ruthenium precursors were selected so as to achieve, after drying and calcining, a final composition having 20 wt % Co metal, 0.5 wt % B, and 0.1 wt % Ru metal in the final catalyst.

Examples C2–C5

Cobalt Catalysts with Ruthenium Promoter on Modified Alumina Supports

EXAMPLES C2–C5 were prepared by impregnating the respective catalyst supports, EXAMPLES S2, S4, S6 and S7, in a manner similar to that described for EXAMPLE C1 with the exception that the boron precursor was omitted. The impregnation was performed with an aqueous solution of cobalt nitrate hexahydrate [Co(NO$_3$)$_2$ 6H$_2$O] and ruthenium nitrosyl nitrate [Ru(NO)(NO$_3$)$_3$] in such concentrations to afford a final composition, after drying and calcining, having 20 wt % Co metal and 0.1 wt % Ru metal in the final composition. The compositions of the obtained Fischer-Tropsch catalyst EXAMPLES C2–C5 (before reduction) are listed in Table 2.

Example C6

Cobalt Catalysts with Platinum Promoter on Unmodified Alumina Support

The preparation of the catalyst of EXAMPLE C6 used the unmodified alumina of EXAMPLE S1. The catalyst preparation was identical to that described for EXAMPLE C1 with the exception that the present catalyst comprises 25 wt % cobalt and a Pt promoter. In the impregnation, an aqueous solution of cobalt nitrate, boric acid and tetraamineplatinum (II) nitrate [Pt(NH$_3$)$_4$(NO$_3$)$_2$] was impregnated on unmodified alumina EXAMPLE S1, so as to achieve a final catalyst composition of 25 wt % Co, 0.5 wt % B and 0.025 wt % Pt. EXAMPLE C6 was prepared for comparative reasons. The composition of the obtained Fischer-Tropsch catalyst EXAMPLE C6 (before reduction) is listed in Table 2.

Examples C7–C8

Cobalt Catalysts with Platinum Promoter on Modified Alumina Supports

The support modified with 6 wt % lanthanum and calcined at 1,100° C., EXAMPLE S5, was used to prepare catalyst EXAMPLES C7 and C8. The catalyst preparation was the same as used in EXAMPLE C1, except that instead of using boron and ruthenium, platinum was used as a promoter. EXAMPLES C7 and C8 had different cobalt and platinum loadings but the same cobalt-to-platinum weight ratio of 1000, so as to achieve a final catalyst composition of 25 wt % Co and 0.025 wt % Pt for EXAMPLE C7; and 30 wt % Co and 0.03 wt % Pt for EXAMPLE C8. The compositions of the obtained Fischer-Tropsch catalyst EXAMPLES C7 and C8 (before reduction) are listed in Table 2.

TABLE 2

| Catalyst EXAMPLE # | Support, Ex # | Support composition | Support Calcination Temp, ° C. | Co, wt % | Ru, wt % | B, wt % | Pt, wt % | Ag, wt % |
|---|---|---|---|---|---|---|---|---|
| C1 | S1 | $Al_2O_3$ | — | 20 | 0.1 | 0.5 | — | — |
| C2 | S2 | 3 wt % $La-Al_2O_3$ | 1,000 | 20 | 0.1 | — | — | — |
| C3 | S4 | 6 wt % $La-Al_2O_3$ | 1,000 | 20 | 0.1 | — | — | — |
| C4 | S6 | 9 wt % $La-Al_2O_3$ | 1,000 | 20 | 0.1 | — | — | — |
| C5 | S7 | 6 wt % $Nd-Al_2O_3$ | 1,000 | 20 | 0.1 | — | — | — |
| C6 | S1 | $Al_2O_3$ | — | 25 | — | 0.5 | 0.025 | — |
| C7 | S5 | 6 wt % $La-Al_2O_3$ | 1,100 | 25 | — | — | 0.025 | — |
| C8 | S5 | 6 wt % $La-Al_2O_3$ | 1,100 | 30 | — | — | 0.03 | — |
| C9 | S1 | $Al_2O_3$ | — | 25 | — | — | — | 2.0 |
| C10 | S3 | 4.5 wt % $La-Al_2O_3$ | 1,000 | 25 | — | — | — | 2.0 |

Examples C9–C10

Cobalt Catalysts with Silver Promoter on Modified and Unmodified Alumina Supports EXAMPLES C9 and C10 were prepared by impregnating the catalyst supports, the unmodified alumina EXAMPLE S1 and La-modified support EXAMPLE S3, respectively, in a manner similar to that described for EXAMPLE C1, except that silver (Ag) was used as a promoter instead of the Ru promoter and B. The impregnation was performed in two steps (instead of a 3-step process as described in EXAMPLE C1) with one aqueous solution containing both silver nitrate [$AgNO_3$] and cobalt nitrate hexahydrate [$Co(NO_3)_2$ $6H_2O$] in such concentrations to afford a final composition, after drying and calcining, having 25 wt % Co metal and 2 wt % Ag metal in the final composition. The compositions of the obtained Fischer-Tropsch catalyst EXAMPLES C9 and C10 (before reduction) are shown in Table 2.

Support and Catalyst Characterization

The above supports and catalysts were physically and chemically characterized by measuring their pore structure (from $N_2$ adsorption-desorption isotherms at 77 K, obtained using a Micromeritics ASAP 2000 instrument), metal dispersion (using a Micromeritics chemisorption apparatus), x-ray diffraction (XRD, using a Siemens 500 instrument with monochromatic Cu-$K_\alpha$ radiation) and reducibility by temperature programmed reduction (TPR, using a Micromeritics instrument).

In addition, steaming experiments were performed with some of the samples to show their resistance to hydrothermal conditions. In those experiments, a Parr autoclave was used and the sample (1 gram) was placed in it in the presence of 15 grams of water. (This amount of water was chosen based on the fact that it caused 50% collapse of a typical pure commercial alumina (TRADEMARK HiQ gamma-$Al_2O_3$ from Alcoa)). The autoclave was heated to 225° C. thereby generating a water vapor pressure of 250 psig. After 2 hours at 225° C. and 250 psig, the autoclave was cooled and opened, and the solid sample was taken out and dried overnight. The steamed (stm) sample was examined for pore structure and compared with the un-steamed starting material. This comparison, for surface area (loss), pore volume (loss) and pore size (gain or loss), can be presented as 'percent difference', % Diff, using the general expression, $$\%Diff = \frac{ValuebeforeStm'g - ValueafterStm'g}{ValuebeforeStm'g} \times 100$$

Results of the characterization are summarized in Table 3.

According to Table 3, the modification of alumina by the rare-earth followed by high temperature calcination caused, as expected, a decrease in surface area and in pore volume, and an increase in pore diameter, the extent of which changes as a function of the rare-earth loading and the calcination conditions. After calcination at 1000° C., the main alumina phase identified was theta-alumina, e.g., for EXAMPLE S4 with 6 wt % La, and this phase was essentially the only phase after calcination at 1,100° C. (EXAMPLE S5, wt % La). As expected, further pore collapse occurred between EXAMPLES S4 and S5 due to increase in calcination temperature, but the theta phase remained free of alpha phase (XRD).

TABLE 3[a]

Physical Properties of Supports and Catalysts

| EXAMPLE | BET, $m^2/g$ | TPV, cc/g | APD, nm | D, % | TMA, $m^2/g$ | ACS, nm | XRD, phase | TPR, ° C. |
|---|---|---|---|---|---|---|---|---|
| S1 | 137 | 0.48 | 14.0 | | | | gamma | |
| S1-stm | 59 | 0.37 | 25.0 | | | | | |
| S1(750) | 132 | 0.47 | 14.2 | | | | gamma | |
| S1(750)-stm | 73 | 0.37 | 20.3 | | | | | |
| S2 | 118 | 0.44 | 14.9 | | | | | |
| S2-stm | 108 | 0.4 | 14.8 | | | | | |
| S4 | 111 | 0.42 | 15.2 | | | | theta | |
| S4-stm | 104 | 0.38 | 14.7 | | | | | |
| S5 | 80 | 0.41 | 21 | | | | theta | |
| S6 | 96 | 0.39 | 16.4 | | | | theta | |
| S6-stm | 89 | 0.36 | 16.1 | | | | | |

TABLE 3a-continued

Physical Properties of Supports and Catalysts

| EXAMPLE | BET, m²/g | TPV, cc/g | APD, nm | D, % | TMA, m²/g | ACS, nm | XRD, phase | TPR, ° C. |
|---|---|---|---|---|---|---|---|---|
| S7 | 123 | 0.44 | 14.4 | | | | | |
| C2 | | | | 8.8 | 11.9 | 11.32 | | 252, 432 |
| C3 | | | | 11.38 | 15.4 | 8.75 | | 259, 444 |
| C4 | | | | 9.02 | 12.21 | 11.03 | | 254, 440 |
| C5 | 99 | 0.28 | 11.3 | 9.7 | 13.12 | 10.27 | | 278, 448 |
| C5-stm | 82 | 0.26 | 12.5 | | | | | |
| C7 | 64 | 0.25 | 15.6 | | | | | | aBET - Surface area by the Brunauer-Emmett-Teller method, TPV—Total Pore Volume, APD—Average Pore Diameter, D - Dispersion by hydrogen chemisorption, TMA—Total Metal Area per gram catalyst calculated from the chemisorption, ACS—Average Crystallite Size calculated from the chemisorption, TPR - metal reduction peaks obtained by temperature programmed reaction with dihydrogen gas.

Steam stability of the modified aluminas was remarkably improved compared to that of the unmodified alumina, with only loss of 6–8% (% Diff) in surface area compared to 60%, and loss of about 10% in pore volume compared to 23% in the unmodified alumina. Even when the non-modified alumina was re-calcined at 750° C., the loss of surface area and pore volume was still high, 45% and 21%, respectively. See EXAMPLE S1 (750) in Table 3, for example. It should be noted that a part of the surface area and pore volume 'loss' in the un-steamed modified alumina when compared with the un-steamed non-modified alumina, was due to the space taken by the rare-earth modifier (i.e., rare-earth oxide added to the alumina). This may explain why without modification, the alumina gained in average pore size after steaming, whereas the post-steaming modified aluminas exhibited somewhat smaller pore size. In general, the steaming experiments proved that the combined rare-earth addition and higher calcination temperature (that without the modification caused more drastic collapse of the gamma-alumina) resulted in a material that had substantially improved stability in the presence of high-temperature and high-pressure steam similar to that prevailing under normal Fischer-Tropsch reaction conditions.

Also according to Table 3, the cobalt catalysts of the La-modified alumina, expected to have the same or better steaming stability, exhibited Co dispersion between about 9 and 11%, considered suitable for the Fischer-Tropsch catalysis. The Nd-containing catalyst, EXAMPLE C5, resembled the La-containing catalysts and had about 10% Co dispersion. Upon steaming, this catalyst lost 17% of its initial surface area and 7% of its pore volume, and its pore size increased by 10% (1 nm). This change in the catalyst was not considered very significant. As expected, the catalysts had smaller surface area, pore volume and pore size than the corresponding starting supports; this was exemplified (Table 3) for EXAMPLES C5 and C7 made from EXAMPLES S7 and S5, respectively.

Catalysts Testing

Catalyst samples of EXAMPLES C1–C10 were tested in a conventional fixed-bed plugged differential lab-scale reactor. The 1-gram catalyst samples diluted with about 12 grams of alpha-alumina to make a total diluted catalyst bed volume of about 10 ml, was placed in the tubular ¼ inch i.d. stainless steel reactor and was first activated in situ by heating to 350° C. at a heating rate of 2° C./min and maintaining the temperature for 16 hours under a flow of gas comprising an equimolar mixture of hydrogen ($H_2$) and nitrogen ($N_2$) at 600 standard cubic centimeter per minute (sccm) at atmospheric pressure. Then the temperature was reduced to the reaction temperature and the hydrogen gas was replaced by a mixture of 60% $H_2$, 30% CO and 10% $N_2$ at a total (nominal) pressure of 350 psig. The gas flow was adjusted to 100 standard cubic centimeter per minute (sccm), to give gas hourly space velocity (GHSV, or SV) of 600 $hr^{-1}$ measured as the volume of reactant gas at standard pressure and temperature per hour per volume of diluted catalyst bed. During a few runs, SV was reduced gradually by adjusting the feed gas flow (to 75 sccm for GHSV 450 $hr^{-1}$, 50 sccm for 300 $hr^{-1}$). Product mass balance, on-line gas analysis and compositional analysis of the collected liquid and wax were done every 24 hours by conventional gas chromatography methods. Results are reported in Table 4. Anderson-Schulz-Flory (ASF) alpha values, based on the $C_{30}$–$C_{45}$ wax range, were found to be 0.88–0.89 for catalyst EXAMPLES C4, C5, C7 and 0.9 (measured after the second day) for catalyst EXAMPLE C10.

TABLE 4

Catalytic Testing

| Catalyst EXAMPLES | Age, days | T, ° C. | GHSV, $hr^{-1}$ | CO Conver., % | $C_{5+}$, g/(kgcat hr) | $CH_4$, wt % |
|---|---|---|---|---|---|---|
| C1 | 1 | 210 | 600 | 53.1 | 535.7 | 8.3 |
| | 2 | 220 | 600 | 88.0 | 880.1 | 8.5 |
| | 3 | 220 | 600 | 82.0 | 818.4 | 8.8 |
| | 4 | 220 | 600 | 78.2 | 776.2 | 9.0 |
| | 5 | 220 | 450 | 91.5 | 675.3 | 8.7 |
| | 6 | 220 | 300 | 98.7 | 475.1 | 9.0 |
| | 7 | 220 | 300 | 91.2 | 448.5 | 8.7 |
| | 8 | 220 | 300 | 87.7 | 427.8 | 8.8 |
| C2 | 1 | 210 | 600 | 45.7 | 461.3 | 6.7 |
| | 2 | 220 | 600 | 78.3 | 787.6 | 7.2 |
| | 3 | 220 | 600 | 71.0 | 711.2 | 7.5 |
| | 4 | 220 | 600 | 67.0 | 668.3 | 7.7 |
| | 5 | 220 | 450 | 81.8 | 613.8 | 7.3 |
| | 6 | 220 | 300 | 95.6 | 465.5 | 7.5 |
| | 7 | 220 | 300 | 87.8 | 437.4 | 7.2 |
| | 8 | 220 | 300 | 85.2 | 425.7 | 7.3 |
| C3 | 1 | 210 | 600 | 22.3 | 219.5 | 7.9 |
| | 2 | 220 | 600 | 39.5 | 378.2 | 9.6 |
| | 3 | 220 | 600 | 37.0 | 352.1 | 10.0 |
| | 4 | 220 | 600 | 35.0 | 331.0 | 10.3 |
| | 5 | 220 | 450 | 45.5 | 324.7 | 10.1 |
| | 6 | 220 | 300 | 65.3 | 316.3 | 9.4 |
| | 7 | 220 | 300 | 63.2 | 305.4 | 9.5 |
| | 8 | 220 | 300 | 62.1 | 298.9 | 9.6 |
| C4 | 1 | 210 | 600 | 17.6 | 171.2 | 7.9 |
| | 2 | 220 | 600 | 23.0 | 210.1 | 10.8 |
| | 3 | 220 | 600 | 19.6 | 176.2 | 11.8 |
| | 4 | 220 | 600 | 18.0 | 161.0 | 12.3 |

TABLE 4-continued

Catalytic Testing

| Catalyst EXAMPLES | Age, days | T, °C. | GHSV, hr$^{-1}$ | CO Conver., % | C$_{5+}$, g/(kgcat hr) | CH$_4$, wt % |
|---|---|---|---|---|---|---|
| | 5 | 220 | 450 | 22.0 | 146.2 | 13.0 |
| | 6 | 220 | 300 | 31.4 | 138.2 | 13.2 |
| | 7 | 220 | 300 | 30.5 | 133.5 | 13.5 |
| | 8 | 220 | 300 | 29.2 | 126.1 | 14.0 |
| C5 | 1 | 220 | 600 | 53.6 | 536.2 | 7.5 |
| | 2 | 220 | 600 | 53.7 | 531.1 | 8.5 |
| | 3 | 220 | 600 | 52.8 | 521.7 | 8.6 |
| | 4 | 220 | 600 | 51.4 | 507.4 | 8.7 |
| C6 | 1 | 210 | 600 | 54.5 | 560.0 | 7.5 |
| | 2 | 210 | 600 | 57.3 | 583.3 | 8.2 |
| | 3 | 220 | 600 | 89.5 | 896.0 | 8.7 |
| | 4 | 220 | 600 | 85.1 | 853.8 | 8.8 |
| | 5 | 220 | 600 | 81.8 | 820.8 | 8.9 |
| | 6 | 220 | 600 | 79.4 | 795.3 | 9.0 |
| C7 | 1 | 210 | 600 | 36.5 | 369.1 | 6.9 |
| | 2 | 210 | 600 | 30.1 | 298.2 | 8.1 |
| | 3 | 220 | 600 | 65.0 | 653.3 | 7.8 |
| | 4 | 220 | 600 | 62.0 | 621.7 | 7.9 |
| | 5 | 220 | 600 | 59.8 | 598.9 | 8.0 |
| | 6 | 220 | 600 | 57.9 | 580.3 | 8.0 |
| C8 | 1 | 210 | 600 | 37 | 373 | 6.6 |
| | 2 | 220 | 600 | 69 | 691 | 6.8 |
| | 3 | 220 | 600 | 64 | 645 | 6.8 |
| | 4 | 220 | 600 | 62 | 621 | 6.9 |
| C9 | 1 | 210 | 600 | 45.2 | 445.6 | 10.0 |
| | 2 | 220 | 600 | 73.0 | 715.0 | 10.4 |
| | 3 | 220 | 600 | 65.1 | 634.5 | 10.8 |
| | 4 | 220 | 600 | 61.4 | 597.0 | 11.0 |
| C10 | 1 | 210 | 600 | 26.5 | 263.8 | 8.4 |
| | 2 | 220 | 600 | 45.9 | 442.1 | 10 |
| | 3 | 220 | 600 | 44.0 | 422.7 | 9.9 |
| | 4 | 220 | 600 | 42.8 | 410.7 | 10.0 |
| C10* | 1 | 204 | 600 | 58.0 | 600.3 | 7.7 |
| | 2 | 225 | 600 | 73.4 | 733.4 | 8.5 |
| | 3 | 225 | 600 | 66.5 | 663.7 | 8.7 |

*repeat run at higher reaction temperature

According to Table 4, under constant reaction conditions, the effect of La modification of the alumina and the increasing La concentration was reduction in activity (as CO conversion) at essentially the same or lower methane selectivity. Catalysts with the La-modified alumina support could be run at slightly higher temperature (by about 5 to 10° C.) to match the activity of the catalysts with the unmodified alumina support. This is exemplified by the Ag-promoted catalysts (by comparing EXAMPLE C10 to EXAMPLE C9 in Table 4). This is further indicated in catalyst EXAMPLES C7 and C8 (6% La, 1,100° C.) when compared to catalyst EXAMPLE C6 (unmodified alumina). In particular, it can be seen that although catalyst EXAMPLES C7 and C8 were less active than EXAMPLE C6 at the same temperature, they were more active at 220° C. than EXAMPLE C6 at 210° C., with apparently somewhat lower methane selectivity. Thus, in general, in addition to being more hydrothermally stable, the catalysts with 4.5–6 wt % La on theta-alumina (calcined at a temperature between about 1,000° C. and 1,100° C.), had better performance (e.g., they gave higher product yield) than those with the unmodified gamma-alumina support S1. However, a slightly higher temperature (by about 5° C.) was required to match the higher CO conversion of the (less stable) catalyst with the unmodified support.

Activity Retention

Figure 2:
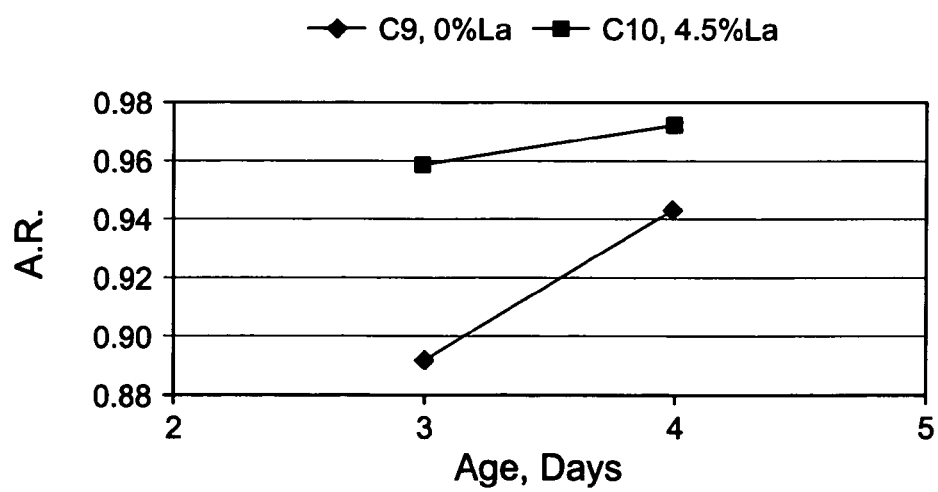
FIG. 2 is a plot illustrating the retention of catalytic activity (A.R.) for Ag-promoted cobalt-based catalysts on unmodified and La-modified alumina supports.

FIGS. 1 and 2 present activity retention (A.R.) data under constant reaction conditions, as defined by $$A.R. = \frac{CO\ Conv. on\ Day\ N}{CO\ Conv. on\ Day\ (N-1)}.$$

The catalysts with 6% rare-earth (EXAMPLES C3 and C5) tend to retain activity somewhat better than the other catalysts, giving A.R. values of 0.97 and above (FIG. 1). Also, EXAMPLE C10 appears to retain activity better than the reference EXAMPLE C9 (FIG. 2). Thus it is indicated that stability gain in the rare-earth loading range of about 4.5 to about 6% by weight is better than outside this range.

Performance Factor

Figure 4:
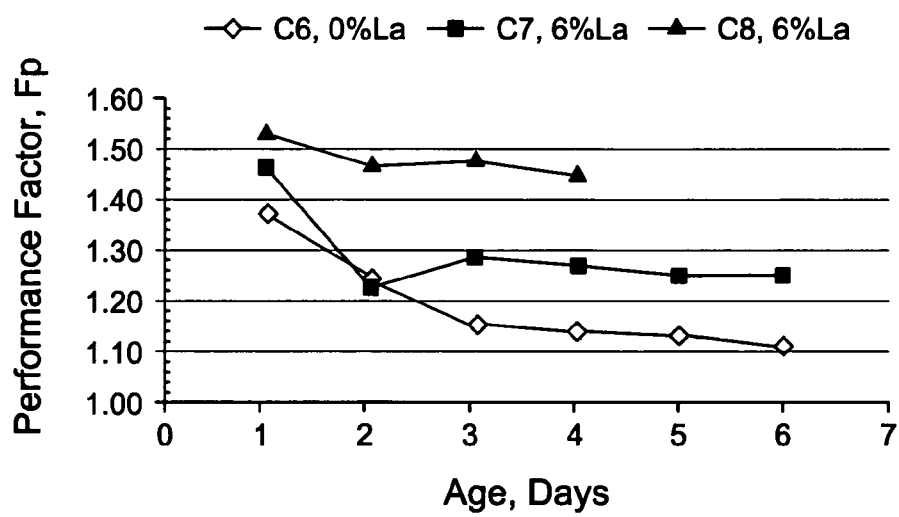
FIG. 4 is a plot comparing the performance factor, $F_p$, of different Pt-promoted cobalt-based catalysts on unmodified and La-modified alumina supports.
Figure 5:
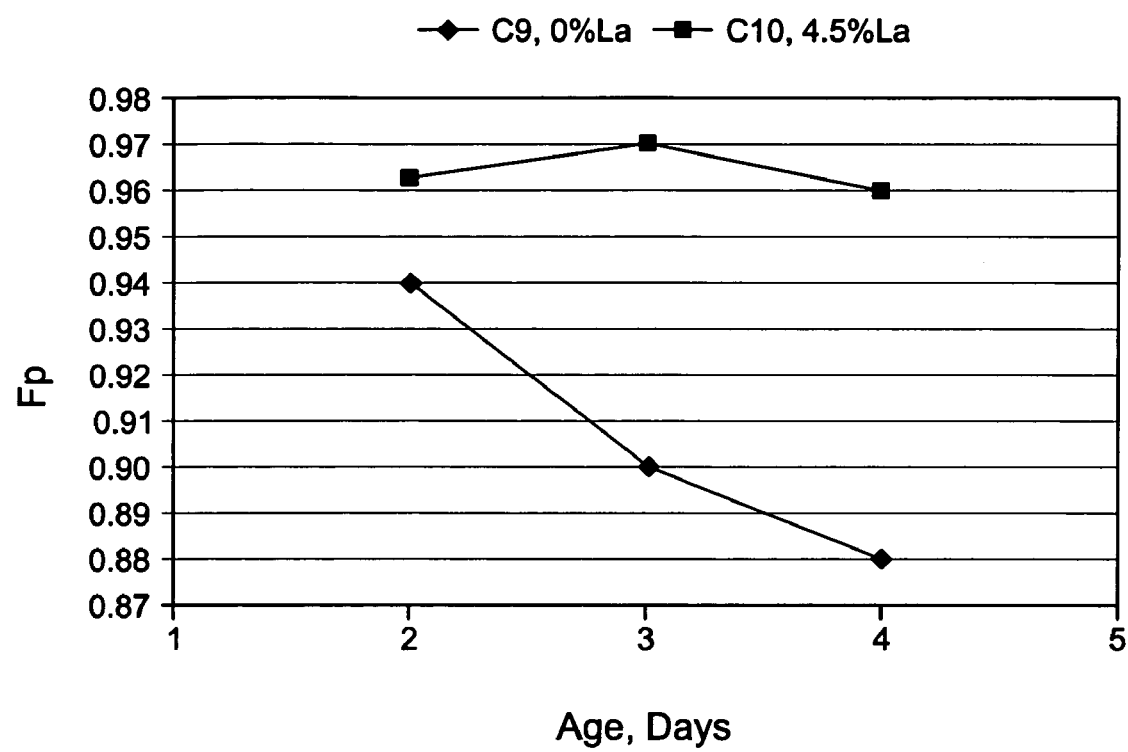
FIG. 5 is a plot comparing the performance factor, $F_p$, of different Ag-promoted cobalt-based catalysts on unmodified and La-modified alumina supports.

To better compare catalysts at different CO conversions and under various reaction conditions (temperature, GHSV, time on stream), a 'performance factor' has been defined as $$F_p = \frac{600 \times C_{5+}}{GHSV \times CO\ Conv. \times CH_4},$$

in which the units are as given in Table 4. This factor allows comparison of the intrinsic behavior of catalysts and conveniently is related to a typical value of about 1 obtained with most catalysts of the above formulations but employing the unmodified alumina support, which will be called 'typical' catalysts. Therefore, $F_p > 1$ means improved performance catalyst whereas $F_p < 1$ reflects poorer performance compared to the 'typical' catalysts. A ±0.1 difference is usually not very significant. EXAMPLE C1, employed as 'reference', is somewhat higher than the 'typical' catalysts, about 1.1 at 220° C. $F_p$ is not sensitive to CO conversion, space velocity and time on stream (age) but somewhat decreases with increase in temperature. Results for catalyst EXAMPLES C1–C5 are presented in FIG. 3, for catalyst EXAMPLES C6–C8 in FIG. 4 and for catalyst EXAMPLES C9 and C10 in FIG. 5.

Figure 3:
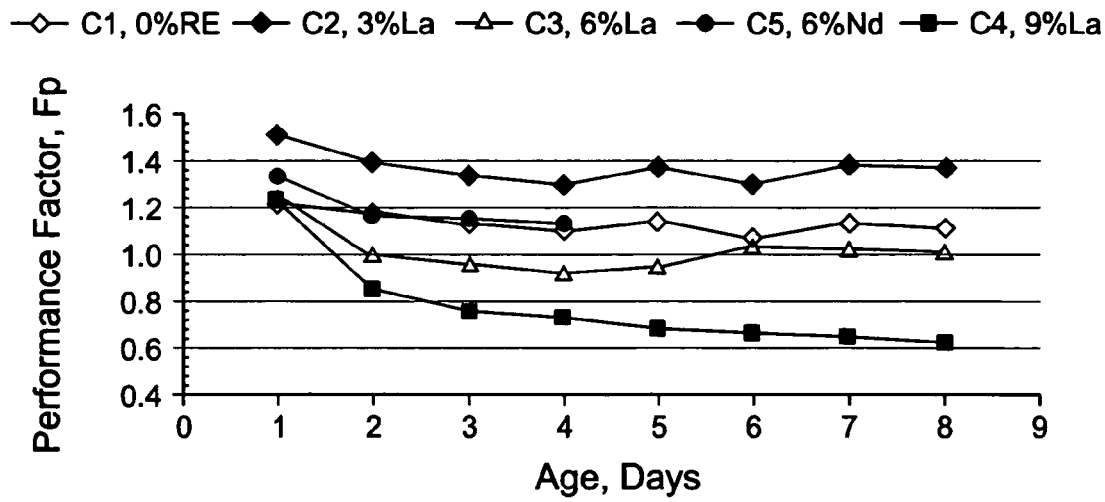
FIG. 3 is a plot comparing the performance factor, $F_p$, of different Ru-promoted cobalt-based catalysts on unmodified, Nd-modified and La-modified alumina supports.

FIG. 3 shows that $F_p$ decreases with increasing rare-earth concentration, and for 3% La (C2) $F_p$ is substantially higher than that of the 'typical' catalysts. However, in terms of $F_p$, catalysts with 6 wt % La (EXAMPLE C3) and 6 wt % Nd (EXAMPLE C5) are close to the 'typical' catalysts, and the catalyst with 9 wt % La (EXAMPLE C4) falls considerably below the 'typical' catalysts. Support strength is increasing with the rare-earth level (Table 3) but the performance factor is decreasing, and therefore, as already mentioned above, a midway rare-earth content between about 3 wt % and about 9 wt %, preferably between about 4 wt % and about 7 wt %, seems the most appropriate and advantageous. In the EXAMPLES C6–C8 series (FIG. 4), the support modification improves $F_p$ and there is a further enhancement by increasing the cobalt content from 25 wt % (EXAMPLE C7) to 30 wt % (EXAMPLE C8). The higher $F_p$ of EXAMPLE C8 is associated with the remarkable lower methane selectivity (<7.0%, as shown in Table 4) of this catalyst, which is highly desirable. Catalyst EXAMPLE C10 exhibits somewhat higher $F_p$ than EXAMPLE C9 (FIG. 5), at 220° C. The $F_p$ behavior of the various catalysts reported here is in full accord with the overall positive effect of rare-earth modification of the alumina support and the gamma-to-theta phase transformation.

The overall conclusion from Table 3, Table 4, the A.R. plots (FIGS. 1 and 2) and the $F_p$ plots (FIGS. 3–5) is that 4.5–6 wt % rare-earth-containing theta-alumina is an excellent support for cobalt based Fischer-Tropsch catalysts, increasing catalyst stability while allowing operation at similar or better product yields and selectivities.

The foregoing detailed description and EXAMPLES have been given for clarity of understanding only. No unnecessary limitations are to be understood therefrom. While a preferred embodiment of the present invention has been shown and described, it will be understood that variations can be made to the preferred embodiment without departing from the scope of, and which are equivalent to, the present invention. For example, the structure and composition of the catalyst can be modified and the order of process steps may be varied. Further, while the EXAMPLES have been described with respect to a continuous-flow differential reactor (fixed bed), the process for producing hydrocarbons may be carried out in a continuous-flow mode in continuously-stirred tank reactors, slurry bubble column reactors, bubble column slurry reactors, fluidized bed reactors, ebulliating bed reactors, and the like. In addition, batch, semi-batch and continuous operations are all envisioned within the scope of the invention. Accordingly, the scope of protection is not limited to the embodiments described herein, but is only limited by the claims that follow, the scope of which shall include all equivalents of the subject matter of the claims.

The invention claimed is:

1. A method of making a catalyst support comprising
   a) applying at least one compound of a rare-earth metal to an aluminum-comprising material to provide a rare-earth metal modified alumina precursor;
   b) drying the rare-earth metal modified alumina precursor under suitable conditions to provide a dried rare-earth metal modified alumina precursor; and
   c) calcining the dried rare-earth metal modified alumina precursor in a manner effective for converting at least a portion of the aluminum-comprising material to an alumina comprising at least one alumina phase selected from the group consisting of delta-alumina, theta-alumina, and combination thereof; and
      creating a surface coverage comprising an oxide of said at least one rare-earth metal, wherein said surface coverage coats the alumina at least partially, and wherein at least one rare-earth metal is trivalent, and further wherein the surface coverage is between about 0.2 nm and about 0.5 nm in thickness.

2. The method according to claim 1 wherein the aluminum-comprising material comprises at least one material selected from the group consisting of aluminum oxides, aluminum salts, aluminum alkoxides, aluminum hydroxides, pseudoboehmite, boehmite, gibbsite, bayerite, gamma-alumina, theta-alumina, delta-alumina, eta-alumina, rho-alumina, chi-alumina, kappa-alumina and any combinations thereof.

3. The method according to claim 1 wherein the aluminum-comprising material comprises a gamma-alumina.

4. The method according to claim 3 wherein the gamma-alumina has a surface area between about 100 m²/g and about 300 m²/g; and a pore volume of at least about 0.2 ml/g.

5. The method according to claim 3 wherein the gamma-alumina comprises no more than about 0.1% by weight $Na_2O$.

6. The method according to claim 1 wherein the compound of the rare-earth metal comprises a counterion selected from the group consisting of nitrate, acetate, oxalate, acetylacetonate, any alkanoate, any halide and sulfate.

7. The method according to claim 6 wherein the compound of the rare-earth metal is in a hydrated form.

8. The method according to claim 1 wherein the rare-earth metal is selected from the group consisting of yttrium, lanthanum, praseodymium, neodymium, samarium and gadolinium.

9. The method according to claim 1 wherein applying a compound of the rare-earth metal is carried out by an impregnation technique.

10. The method according to claim 9 wherein the impregnation technique is performed at about or below ambient pressure.

11. The method according to claim 9 wherein the impregnation technique is incipient wetness impregnation.

12. The method according to claim 1 wherein calcining is effective for creating a rare-earth metal oxide surface layer that completely covers the alumina surface.

13. The method according to claim 1 wherein calcining is effective for converting at least a portion of the aluminum-comprising material to a transition alumina comprising theta-alumina.

14. The method according to claim 1 wherein calcining is performed at a temperature between about 800° C. and about 1,400 ° C.

15. The method according to claim 14 wherein calcining is performed at a temperature between about 1,000° C. and about 1,300° C.

16. The method of making a catalyst support according to claim 1 further comprising applying at least one compound of another rare-earth metal.

17. The method according to claim 16 wherein the application of at least one compound of another rare-earth metal is performed simultaneously to step a).

18. The method according to claim 16 wherein the application of at least one compound of another rare-earth metal is performed after step c).

19. The method according to claim 18 further comprising calcining at a temperature between about 300° C. and 900° C.

20. A Fischer-Tropsch catalyst comprising
   at least one catalytically active metal comprising cobalt, wherein the cobalt metal is dispersed in crystallites having an average size of between about 5 nm and about 20 nm;
   optionally, at least one promoter; and
   a rare-earth metal oxide modified catalyst support including
      at least one alumina material comprising an alumina phase selected from the group consisting of delta-alumina, theta-alumina, and combination thereof; and optionally gamma-alumina; and
      a surface coverage comprising an oxide of at least one rare-earth metal, wherein said coverage coats the alumina material at least partially, and wherein the at least one rare-earth metal is trivalent.

21. The catalyst of claim 20 wherein the catalytically active metal is present in an amount between about 1% and about 50% by weight of metal to final weight of catalyst.

22. The catalyst of claim 20 wherein the promoter comprises one element from Groups 1–14 of the Periodic Table of Elements.

23. The catalyst of claim 20 wherein the promoter comprises at least one metal selected from the group consisting of platinum, palladium, silver, ruthenium, iridium, rhodium, and rhenium.

24. The catalyst of claim 20 wherein the cobalt metal is dispersed in crystallites arranged on the surface coverage comprising at least one trivalent rare-earth metal oxide.

25. The catalyst according to claim 20 wherein the trivalent rare-earth metal is selected from the group consisting of yttrium, lanthanum, praseodymium, neodymium, samarium and gadolinium.

26. The catalyst of claim 20 wherein the rare-earth metal oxide modified catalyst support further comprises a structural modifier, and said structural modifier comprises one element selected from the group consisting of boron, magnesium, silicon, calcium, titanium, chromium, manganese, iron, cobalt, nickel, copper, zinc, gallium, strontium, zirconium, molybdenum, tin, and barium.

27. The catalyst according to claim 20 wherein the catalyst is used to practice any process for converting a reactant gas mixture comprising synthesis gas under suitable conditions to a product mixture comprising linear hydrocarbons.

28. The catalyst according to claim 27 wherein the conditions suitable for converting a reactant gas mixture comprise a temperature no less than 160° C. and a pressure no less than about 5 atm.

29. The catalyst according to claim 28 further comprising no more than about 10 mol% aluminate spinels comprising the catalytically active metal before, during or after said process.

30. The catalyst according to claim 28 wherein the alumina that comprises the support retains its original phase upon exposure to said process.

31. The catalyst according to claim 28 wherein the promoter retains a majority of its original activity upon exposure to said process.

32. The catalyst of claim 20 wherein the catalyst comprises between about 5 and about 40% cobalt.

33. The catalyst according to claim 20 wherein the catalyst comprises between about 15% and about 35% by weight of cobalt to final weight of catalyst.

34. The catalyst according to claim 20 wherein the trivalent rare-earth metal is present in an amount between about 1% and about 15% by weight of metal to final weight of modified support.

35. The catalyst according to claim 20 wherein the at least one rare-earth metal is present in an amount between about 3% and about 10% by weight of metal based on the final weight of the modified support.

36. The catalyst according to claim 20 wherein the trivalent rare-earth metal is selected from the group consisting of lanthanum, praseodymium and neodymium.

37. The catalyst according to claim 20 wherein the rare-earth metal oxide modified catalyst support has a surface area between about 40 $m^2/g$ and about 150 $m^2/g$; and a pore volume between about 0.1 $cm^3/g$ and about 0.5 $cm^3/g$.

38. The catalyst according to claim 20 wherein the rare-earth metal oxide modified catalyst support has a surface area between about 70 $m^2/g$ and about 130 $m^2/g$.

39. The catalyst according to claim 20 wherein the surface coverage coats the alumina material completely.

40. The catalyst according to claim 20 wherein the surface coverage has a thickness of at least about 0.2 nanometer.

41. The catalyst according to claim 20 wherein the surface coverage is between about 0.2 nm and about 0.5 nm in thickness.

42. The catalyst according to claim 20 wherein the rare-earth metal oxide modified catalyst support comprises at least 20% delta-alumina; at least 20% theta-alumina or at least 20% of combined delta-theta-alumina.

43. The catalyst according to claim 20 wherein the rare-earth metal oxide modified catalyst support comprises at least 20% theta-alumina.

44. The catalyst according to claim 20 wherein the catalyst is in the form of particles which are embedded in oil or solid hydrocarbon.

45. A method of making a Fischer-Tropsch catalyst comprising
applying at least one compound of a catalytically active metal to a rare-earth metal oxide modified catalyst support to form a catalyst precursor, wherein the rare-earth metal oxide modified catalyst support includes
at least one alumina material comprising an alumina phase selected from the group consisting of theta-alumina, delta-alumina, eta-alumina, rho-alumina, chi-alumina, kappa-alumina, and any combinations thereof; and optionally gamma-alumina; and
a surface coverage comprising an oxide of at least one rare-earth metal, wherein said coverage coats the alumina material at least partially, and wherein the at least one rare-earth metal is trivalent;
calcining said catalyst precursor; and
reducing calcined catalyst precursor to form a reduced catalyst; and further embedding the reduced catalyst in oil or solid hydrocarbon.

46. The method of claim 45 wherein the trivalent rare-earth metal is selected from the group consisting of yttrium, lanthanum, praseodymium, neodymium, samarium and gadolinium.

47. The method of claim 46 wherein the rare-earth metal oxide modified catalyst support comprises between about 1 wt% and about 15 wt% of rare-earth metal.

48. The method of claim 45 wherein the rare-earth metal oxide modified catalyst support comprises an alumina phase containing essentially theta-alumina.

49. The method of claim 45 wherein applying at least one compound of a catalytically active metal is done by impregnation.

50. The method of claim 45 wherein the catalytically active metal comprises cobalt.

51. The method of claim 50 wherein the catalyst comprises between about 5 and about 40% cobalt.

52. The method of claim 50 wherein the compound of the catalytically active metal comprises cobalt nitrate, cobalt nitrate hexahydrate, cobalt acetate, cobalt acetylacetonate, or combinations thereof.

53. The method of claim 50 wherein the cobalt metal is dispersed in crystallites having an average size of between about 1 nm and about 20 nm.

54. The method of claim 50 wherein the cobalt metal is dispersed in crystallites having an average size of between about 5 nm and about 20 nm.

55. The method of claim 45 wherein the catalytically active metal comprises iron.

56. The method of claim 45 further comprising applying a compound of a promoter.

57. The method of claim 56 wherein the compounds of catalytically active metal and of the promoter are applying simultaneously by impregnation.

58. The method of claim 56 wherein the catalytically active metal is cobalt and the promoter comprises at least one metal selected from the group consisting of platinum, palladium, silver, ruthenium, iridium, rhodium, and rhenium.

59. The catalyst of claim 56 wherein the catalytically active metal is iron, and the promoter comprises at least one metal selected from the group consisting of sodium, copper, potassium, lithium, and silver.

60. A process for convening synthesis gas to hydrocarbons, wherein the process comprises
converting a reactant gas mixture comprising hydrogen and carbon monoxide under conditions effective for producing a product mixture comprising waxy paraffinic hydrocarbons over a hydrocarbon synthesis catalyst comprising
at least one catalytically active metal comprising cobalt, wherein the cobalt metal is dispersed in crystallites having an avenge size of between about 5 nm and about 20 nm;
optionally, at least one promoter; and
a rare-earth metal oxide modified catalyst support comprising
an alumina material comprising optionally gamma-alumina, and at least one alumina phase selected from the group consisting of delta-alumina, theta-alumina, and combinations thereof; and
a surface coverage comprising at least one rare-earth metal oxide, wherein the at least one rare-earth metal is trivalent, and wherein said coverage coats the alumina material at least partially.

61. The process according to claim 60 wherein the reactant gas mixture has a $H_2$:CO ratio between 0.67:1 and 5:1.

62. The process according to claim 60 wherein the reactant gas mixture has a $H_2$:CO ratio between 1.4:1 and 2.3:1.

63. The process according to claim 60 wherein the waxy paraffinic hydrocarbons comprise linear hydrocarbons having at least 18 carbon atoms.

64. The process according to claim 60 wherein the process produces a hydrocarbon mixture having an alpha value of at least 0.85.

65. The process according to claim 60 wherein the process produces methane and has a methane selectivity not more than about 10 wt %.

66. The process according to claim 60 wherein the waxy hydrocarbons contain no more than 100 ppm of catalytically active metal.

67. The process of claim 60 wherein the catalytically active metal is cobalt, and the hydrocarbon synthesis catalyst further comprises a promoter, and further wherein said promoter comprises at least one metal selected from the group consisting of platinum, palladium, silver, ruthenium, iridium, rhodium, and rhenium.

68. The process according to claim 60 wherein the rare-earth metal is selected from the group consisting of yttrium, lanthanum, praseodymium, neodymium, samarium and gadolinium.

69. The process according to claim 60 wherein the rare-earth metal oxide modified catalyst support comprises between about 1 wt % and about 15 wt % of rare-earth metal.

70. The process according to claim 60 wherein the trivalent rare-earth metal is present in an amount between about 3% and about 10% by weight of rare-earth metal to final weight of modified support.

71. The process according to claim 60 wherein the catalyst comprises between about 15% and about 35% by weight of cobalt to final weight of catalyst.

72. The process according to claim 60 wherein the rare-earth metal oxide modified catalyst support comprises at least 20% theta-alumina.

73. The process according to claim 60 wherein the rare-earth metal oxide modified catalyst support has a surface area between about 40 $m^2$/g and about 150 $m^2$/g; and a pore volume between about 0.1 $cm^3$/g and about 0.5 $cm^3$/g.

74. The process according to claim 60 wherein the catalyst further comprising no more than about 10 mol% aluminate spinels comprising the catalytically active metal before, during or after said process.

75. The process according to claim 60 wherein the catalyst is essentially free of aluminate spinels comprising the catalytically active metal before said process or during said process or both.

* * * * *